US009399566B2

(12) United States Patent
Hall et al.

(10) Patent No.: US 9,399,566 B2
(45) Date of Patent: Jul. 26, 2016

(54) GROOVED DRUM AND ASSOCIATED ROLLER FOR MOTORIZED LIFTING DEVICE

(71) Applicants: David R. Hall, Provo, UT (US); Jerome Miles, Spanish Fork, UT (US); Michael Hall, Provo, UT (US); Daniel Madsen, Vineyard, UT (US); Ben Taylor, Provo, UT (US)

(72) Inventors: David R. Hall, Provo, UT (US); Jerome Miles, Spanish Fork, UT (US); Michael Hall, Provo, UT (US); Daniel Madsen, Vineyard, UT (US); Ben Taylor, Provo, UT (US)

( * ) Notice: Subject to any disclaimer, the term of this patent is extended or adjusted under 35 U.S.C. 154(b) by 102 days.

(21) Appl. No.: 14/245,637

(22) Filed: Apr. 4, 2014

(65) Prior Publication Data

US 2015/0284223 A1    Oct. 8, 2015

Related U.S. Application Data

(63) Continuation of application No. 14/245,396, filed on Apr. 4, 2014, and a continuation of application No. 14/245,308, filed on Apr. 4, 2014, and a continuation of application No. 14/245,234, filed on Apr. 4, 2014, and a continuation of application No. 14/245,132, filed on Apr. 4, 2014, and a continuation of application No. 14/245,095, filed on Apr. 4, 2014, and a continuation of application No. 14/245,055, filed on Apr. 4, 2014, and a continuation of application No. 14/245,000, filed on Apr. 4, 2014, and a continuation of application No. 14/244,771, filed on Apr. 3, 2014.

(60) Provisional application No. 61/822,644, filed on May 13, 2013, provisional application No. 61/924,157, filed on Jan. 6, 2014, provisional application No. 61/925,144, filed on Jan. 8, 2014, provisional application No. 61/925,182, filed on Jan. 8, 2014, provisional application No. 61/933,508, filed on Jan. 30, 2014.

(51) Int. Cl.
    *B66D 1/26* (2006.01)
    *B66D 1/38* (2006.01)
    *B66D 1/22* (2006.01)
    *B66D 1/48* (2006.01)
    *B66D 1/58* (2006.01)

(52) U.S. Cl.
    CPC .. *B66D 1/38* (2013.01); *B66D 1/22* (2013.01); *B66D 1/485* (2013.01); *B66D 1/58* (2013.01)

(58) Field of Classification Search
    CPC .............. B66D 1/36; B66D 1/38; B66D 1/42; B65H 23/00; B65H 23/25; B65H 23/025; B65H 57/14
    See application file for complete search history.

(56) References Cited

U.S. PATENT DOCUMENTS

| | | | | |
|---|---|---|---|---|
| 2,348,987 A * | 5/1944 | Frank | | 242/157.1 |
| 2,926,867 A * | 3/1960 | Nardone | | 242/397.3 |
| 3,226,090 A * | 12/1965 | Sauerbrey | | 254/284 |
| 3,901,479 A * | 8/1975 | Arnold | | 242/157 R |
| 7,104,492 B1 * | 9/2006 | Massell et al. | | 242/397 |
| 2010/0032509 A1* | 2/2010 | Cazzaro et al. | | 242/397.3 |
| 2010/0314594 A1* | 12/2010 | Seow | | 254/333 |

* cited by examiner

*Primary Examiner* — Emmanuel M Marcelo

(57) ABSTRACT

An apparatus includes a drum to draw in or let out a line and a motor coupled to the drum to apply a torque thereto. The drum includes a groove formed in an outer surface thereof to accommodate the line. A roller is provided that tracks the groove and extends into the groove. The roller pushes the line into the groove. In certain embodiments, the roller pushes the line to a bottom of the groove to ensure that the line is properly seated therein.

20 Claims, 45 Drawing Sheets

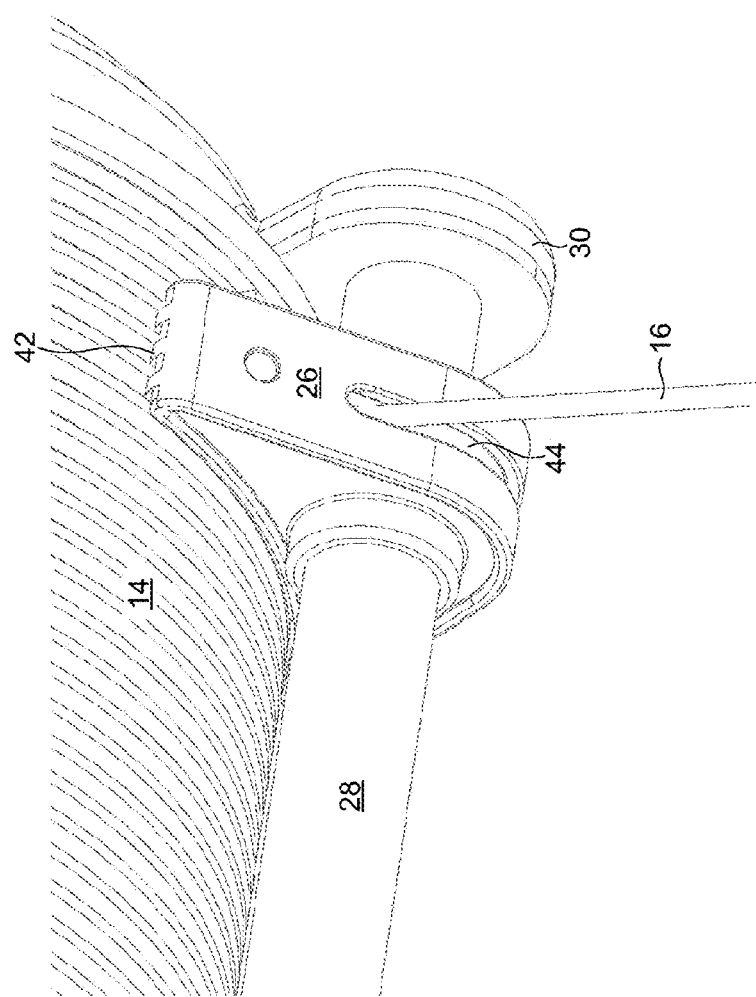

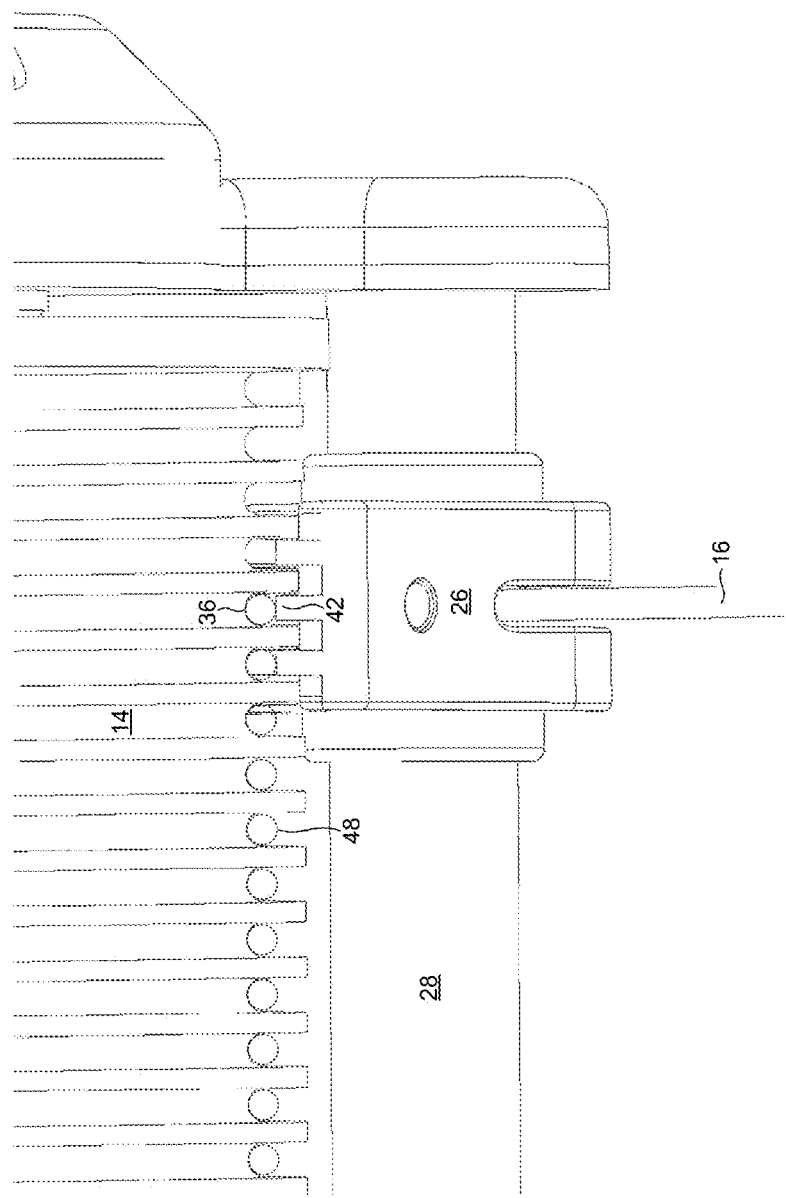

GROOVED DRUM AND ASSOCIATED ROLLER FOR MOTORIZED LIFTING DEVICE

RELATED APPLICATIONS

This application claims priority to U.S. Provisional Patent No. 61/822,644 filed on May 13, 2013 and entitled "A Winch System Comprising Insulated Cables"; U.S. Provisional Patent No. 61/924,157 filed on Jan. 6, 2014 and entitled "Cable Guide"; U.S. Provisional Patent No. 61/925,144 filed on Jan. 8, 2014 and entitled "Smart Lift"; U.S. Provisional Patent No. 61/925,182 filed on Jan. 8, 2014 and entitled "Smart Multi Lift"; and U.S. Provisional Patent No. 61/933,508 filed on Jan. 30, 2014 and entitled "Lift Platform".

This application is a continuation of U.S. patent application Ser. No. 14/245,495 filed on Apr. 4, 2014 and entitled "Motorized Lifting Device Conveying Power and/or Data"; which is a continuation of U.S. patent application Ser. No. 14/245,396 filed on Apr. 4, 2014 and entitled "Load Distribution Management for Groups of Motorized Lifting Devices"; which is a continuation of U.S. patent application Ser. No. 14/245,308 filed on Apr. 4, 2014 and entitled "Accurate Position Tracking for Motorized Lifting Device"; which is a continuation of U.S. patent application Ser. No. 14/245,234 filed on Apr. 4, 2014 and entitled "Intelligent Motorized Lifting Device"; which is a continuation of U.S. patent application Ser. No. 14/245,132 filed on Apr. 4, 2014 and entitled "Synchronized Motorized Lifting Devices for Lifting Shared Loads"; which is a continuation of U.S. patent application Ser. No. 14/245,095 filed on Apr. 4, 2014 and entitled "Motorized Lifting Device with Accurate Weight Measuring Capability"; which is a continuation of U.S. patent application Ser. No. 14/245,055 filed on Apr. 4, 2014 and entitled "Motorized Lifting Device with Isolated Logistics and Power Electronics"; which is a continuation of U.S. patent application Ser. No. 14/245,000 filed on Apr. 4, 2014 and entitled "Locking Mechanism for Motorized Lifting Device"; which is a continuation of U.S. patent application Ser. No. 14/244,771 filed on Apr. 3, 2014 and entitled "Compact Motorized Lifting Device".

BACKGROUND

1. Field of the Invention

This invention relates to hoists, winches, and other pulling and/or lifting devices.

2. Background of the Invention

Hoists and winches are used extensively to lift, lower, or pull loads of various kinds Such devices typically include a line, such as a cable or chain, wrapped around a spool. To lift, lower, or pull a load, the spool may be manually rotated or driven with a motor, such as an electrical, hydraulic, or pneumatic motor. When rotation is not desired, a braking mechanism may be used to prevent the spool from turning. This may maintain tension in the line, keep a load suspended, or prevent the release or unspooling of the line. To keep the line from bunching on the spool, some hoists or winches may include guides or other mechanisms to evenly wind the line around the spool.

Although a wide variety of hoists and winches are available, many have shortcomings that prevent or discourage their use in various applications. For example, some hoists or winches are bulky or cumbersome, which may prevent their use in applications where greater compactness is required or desired. Other hoists and winches may be economically infeasible for use in applications such as consumer or residential applications due to their complexity or expense.

The accuracy and precision of some hoists and winches may also be lacking in certain applications. For example, because the line of a hoist or winch may be wound around itself in an irregular or unpredictable manner, the effective diameter of the spool may change for line that is drawn in or let out from the spool. The result is that, for any given angle of rotation of the spool, an unpredictable amount of line may be drawn in or let out. This can make the hoist or winch unsuitable for applications where a high degree of precision is required. It can also make the winch or hoist unsuitable for operations that require a high degree of repeatability.

Some hoists and winches may also have shortcomings in terms of the control and information they provide. For example, current hoists and winches may lack mechanisms for determining certain parameters during operation. For example, short of manually measuring or observing a hoist or winch, it may be difficult or impossible to determine how much line is let out from the hoist or winch at any given time. Even if possible, it may not be possible to do so with a desired degree of precision. In other cases, the ability to determine a load on the hoist or winch, or adjust the speed of a hoist or winch (which may depend on the load) may be lacking. In yet other cases, an event such as a power outage or reset may cause a hoist or winch to forget or lose information regarding current operating parameters.

As with most fields of endeavor, improvements are constantly sought after by those of skill in the art. As it relates to hoists and winches, improvements are needed to address bulkiness, complexity, expense, precision, and control, as discussed herein. Ideally, such improvements will create new applications for hoists or winches, or make hoists or winches more economically or practically feasible for existing applications.

SUMMARY

The invention has been developed in response to the present state of the art and, in particular, in response to the problems and needs in the art that have not yet been fully solved by currently available apparatus and methods. Accordingly, apparatus and methods in accordance with the invention have been developed to provide improved motorized lifting or pulling devices. The features and advantages of the invention will become more fully apparent from the following description and appended claims, or may be learned by practice of the invention as set forth hereinafter.

In a first embodiment of the invention, an apparatus includes a motor and a drum rotated by the motor to draw in or let out a line from the drum. The drum includes a groove formed in an outer surface thereof to accommodate the line. In certain embodiments, a depth of the groove is equal to or greater than a radius of the line. In the same or other embodiments, a passive guide that physically engages and tracks the groove may be used to guide the line into the groove.

In a second embodiment of the invention, an apparatus includes a drum to draw in or let out a line, and a motor and transmission coupled to the drum to apply a torque thereto. In certain embodiments, the motor and transmission are substantially entirely contained within the drum. In the same or other embodiments, a bearing may provide support for both the transmission and the drum.

In a third embodiment of the invention, an apparatus includes a drum to draw in or let out a line and a motor and transmission coupled to the drum to apply a torque thereto. The transmission includes at least one stage of gearing to reduce a gear ratio of the motor relative to the drum. A shaft couples the motor to the transmission and a locking mechanism selectively locks the shaft to prevent rotation of the drum. In certain embodiments, a braking mechanism may be provided in addition to the locking mechanism to slow the motor when the motor is not applying torque to the drum. This may slow the motor sufficiently to enable engagement of the locking mechanism.

In a fourth embodiment of the invention, an apparatus includes a drum to draw in or let out a line and a motor and transmission coupled to the drum to apply a torque thereto. Logistics electronics are mounted proximate a first end of the drum and power electronics are mounted proximate a second end of the drum. In general, the logistics electronics include lower power electronics that enable data processing as well as data and commands to be communicated to the apparatus from an external location. By contrast, the power electronics may include higher power electronics needed to receive power and drive the motor.

In a fifth embodiment of the invention, an apparatus includes a drum to draw in or let out a line and a motor and transmission coupled to the drum to apply a torque thereto. A power sensor measures an amount of current drawn and/or voltage supplied to the motor as the motor applies torque to the line. A processor calculates an amount of weight that is attached to the line based on the amount of power consumed by the motor. Alternatively, if the motor is operated in generator mode, a current sensor may measure an amount of current generated by the motor and the processor may calculate an amount of weight that is attached to the line based at least partly on an amount of current that is generated by the motor.

In a sixth embodiment of the invention, a system includes multiple lifting devices, where each lifting device includes a drum to draw in or let out a line, and a motor and transmission coupled to the drum to apply a torque thereto. A grouping module is provided to group the lifting devices for synchronized operation. A synchronization module monitors an amount of line that is drawn in or let out from each of the lifting devices and, based on the amount, adjusts operating parameters (e.g., position, speed, etc.) of one or more of the lifting devices in the group to substantially synchronize the amount of line drawn in or let out with other lifting devices in the group.

In a seventh embodiment of the invention, an apparatus includes a drum to draw in or let out a line and a motor and transmission coupled to the drum to apply a torque thereto. A tracking module tracks an actual amount of line let out from the drum. A servo control unit receives the actual amount, compares the actual amount to a desired amount of line to let out from the drum, and generates an error signal reflecting a difference between the actual amount and the desired amount. A modulation module generates, from the error signal, a control signal to control the motor, thereby bringing the actual amount into better alignment with the desired amount.

In an eighth embodiment of the invention, an apparatus includes a drum to draw in or let out a line and a motor and transmission coupled to the drum to apply a torque thereto. An encoder is provided to measure an angular position of the drum. A counter is provided to record a number of rotations of the drum. A locking mechanism automatically prevents rotation of the drum when the drum stops. Using this information, a processor may calculate an amount of line let out from the drum based on the number of rotations of the drum, the angular position of the drum, and a radius of the drum. In certain embodiments, the angular position and/or number of rotations is stored in non-volatile memory so that is can be recovered in the event of a power outage or other significant event.

In a ninth embodiment of the invention, a system includes multiple lifting devices, where each lifting device includes a drum to draw in or let out a line, and a motor and transmission coupled to the drum to apply a torque thereto. A grouping module groups the lifting devices for synchronized operation in lifting a shared load. A load distribution management module monitors an amount of weight carried by each of the grouped lifting devices and provides feedback to a user to enable more optimal distribution of the shared load amongst the grouped lifting devices.

In a tenth embodiment of the invention, an apparatus includes a drum to draw in or let out a line and a motor and transmission coupled to the drum to apply a torque thereto. A cable is incorporated into the line to transport at least one of power and data along the line to an object or device at the end of the line. In certain embodiments, the cable is configured to support all or a portion of the load. In other embodiments, the line includes a load-bearing wire separate from the cable which is configured to support all or a portion of the load.

In an eleventh embodiment of the invention, an apparatus includes a drum to draw in or let out a line and a motor coupled to the drum to apply a torque thereto. The drum includes a groove formed in an outer surface thereof to accommodate the line. A roller is provided that tracks the groove and extends into the groove. The roller pushes the line into the groove. In certain embodiments, the roller pushes the line to a bottom of the groove to ensure that the line is properly seated therein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 is a cutaway perspective view of the passive guide interfacing with the grooved drum;

FIG. 8 is a cutaway side view of the passive guide interfacing with the grooved drum;

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
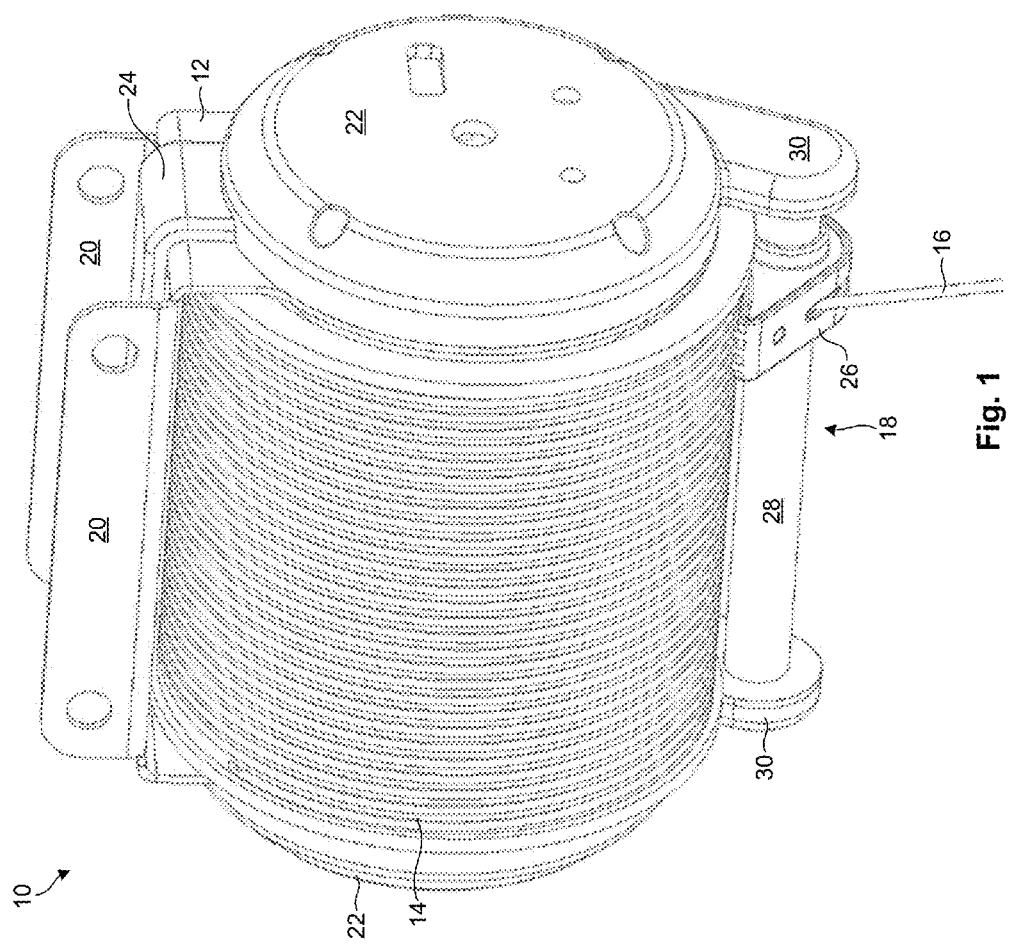
FIG. 1 is a perspective view showing one embodiment of a motorized lifting device in accordance with the invention.

Referring to FIG. 1, a perspective view showing one embodiment of a motorized lifting device 10 in accordance with the invention is illustrated. Although the motorized lifting device 10 is described herein primarily as it relates to lifting objects, the device 10 may also be used to pull loads in the manner of conventional winches. Thus, nothing in this disclosure should be interpreted as indicating that the motorized lifting device 10 is only suitable for lifting. Many of the features and functions described herein related to lifting may be equally beneficial to pulling loads.

As will be explained in more detail hereafter, the motorized lifting device 10 may address a multitude of different shortcomings of the prior art, such as problems with bulkiness, precision, and control. Such improvements will ideally create new applications for hoists or winches, or make hoists or winches more economically or practically feasible for existing applications. As will be explained in more detail hereafter, the illustrated motorized lifting device 10 is compact relative to other devices with similar capability and function, and has features to provide improved precision and control. In some respects, the precision and control of the motorized lifting device 10 is similar to the precision and control provided by modern-day computer numerical control (CNC) machine tools. For example, the features and functions of the motorized lifting device 10 make it possible to know at all times where the end of the line is, or position the end of the line at a desired location. This capability enables a wide variety of other features and functions, the likes of which will be explained in more detail hereafter.

FIG. 1 provides an external view of one embodiment of a motorized lifting device 10. Many internal features are hidden from view. Such internal features will be illustrated and described in the Figures and description that follow. As shown in FIG. 1, the motorized lifting device 10 includes a frame 12, a drum 14 for letting out or drawing in a line 16, and a passive guiding mechanism 18 for guiding the line 16 onto or off of the drum 14. In the illustrated embodiment, the drum 14 is grooved. That is, the drum 14 includes a continuous groove (e.g. a helical groove) around a circumference thereof. This allows the drum 14 to receive and retain the line 16 in the groove. The advantages provided by the grooved drum 14 will be described in more detail hereafter. The grooved drum 14 is rotated by a motor and transmission (not shown), which in the illustrated embodiments are substantially entirely contained within the grooved drum 14. This makes the motorized lifting device 10 very compact and potentially expands a number of applications for the device 10. The motor and transmission are illustrated and described in association with FIGS. 11 through 13.

Other details of FIG. 1 are worth noting. As shown in FIG. 1, the frame 12 of the motorized lifting device 10 includes a pair of flanges 20. The flanges 20 may enable the motorized lifting device 10 to be quickly and easily connected to a bracket (not shown) with pins, bolts, or other fasteners. Such a bracket may be attached to a ceiling joist, wall stud, or other structural member, as will be explained in more detail in association with FIG. 33. The flanges 20 may also allow the motorized lifting device 10 to be quickly and easily removed or attached to another bracket in a different location. Thus, the motorized lifting device 10 may be configured for quick and easy attachment and removal from ceilings, walls, or the like.

As shown, the motorized lifting device 10 includes cover plates 22 at each end. In certain embodiments, the cover plates 22 cover electronics located at the ends of the motorized lifting device 10. For example, as will be explained in more detail hereafter, logistics electronics may be mounted at or near a first end of the motorized lifting device 10 and power electronics may be mounted at or near a second end of the motorized lifting device 10. The logistics electronics may include lower power electronics such as data processing microelectronics or communication electronics that enable data and commands to be communicated to the motorized lifting device 10 from an external location. The power electronics may include higher power electronics to receive power and drive the motor. Placing the logistics electronics and power electronics on separate ends of the motorized lifting device 10 may prevent noise, generated by the power electronics, from interfering with operation of the logistics electronics. In certain embodiments, a power and/or data cable 24, such as a ribbon cable, may be routed across a top of the frame 12 to enable power and/or data to be communicated between the logistics electronics and the power electronics.

As shown, a passive guiding mechanism 18 guides the line 16 into the groove of the drum 14. As will be explained in more detail hereafter, the passive guiding mechanism 18 may include a passive guide 26 that moves along a slide 28 substantially perpendicular to the groove. In certain embodiments, the slide 28 is retained by a pair of arms 30 that extend from the motorized lifting device 10. The passive guide 26 may include one or more teeth that ride in and track the groove as the drum 14 rotates. When the drum 14 rotates in a first direction, the passive guide 26 guides the line 16 into the groove. When the drum 14 rotates in an opposite direction, the passive guide 26 guides the line 16 out of the groove. The passive guide 26 is referred to as "passive" because no additional power source is needed to move the passive guide 26 along the slide 28. Rotation of the drum 14 combined with tracking of the groove is sufficient to move the passive guide 26 along the slide 28 and guide the line 16 into or out of the groove.

Figure 2:
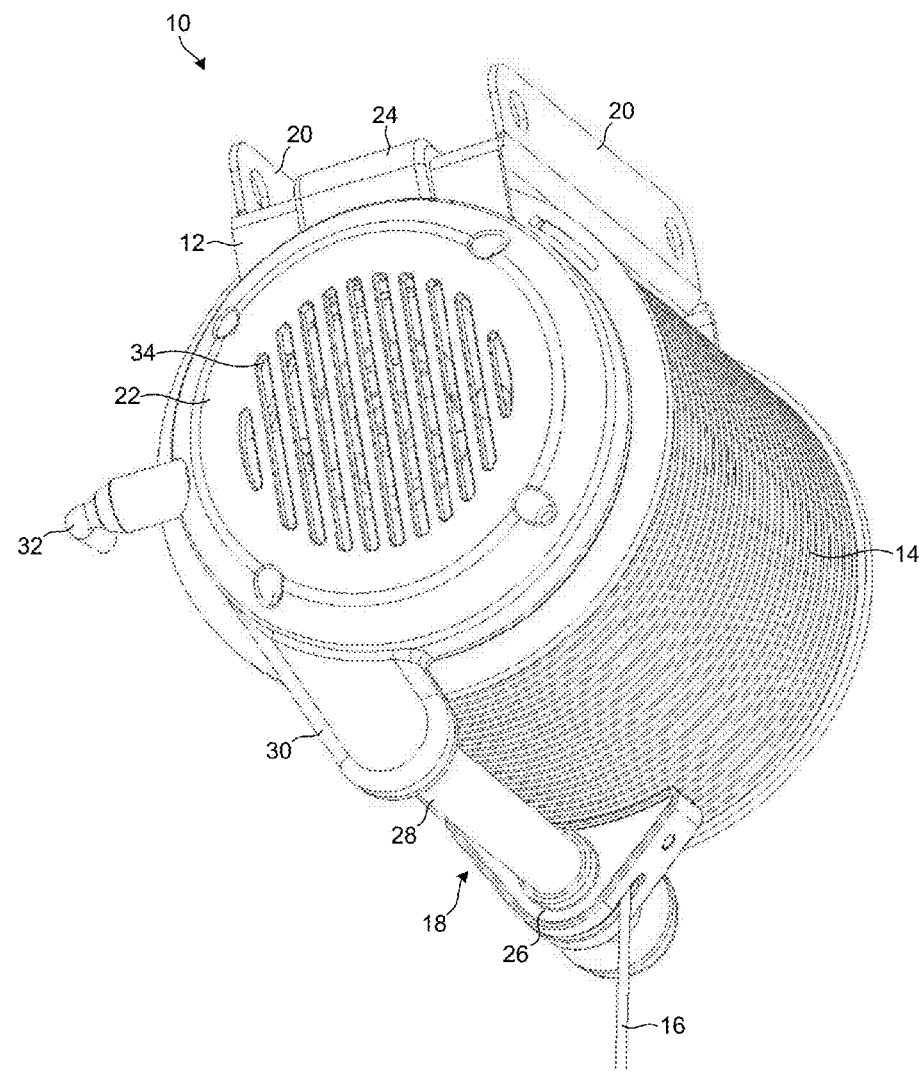
FIG. 2 is an alternative perspective view of the motorized lifting device illustrated in FIG. 1.
Figure 3:
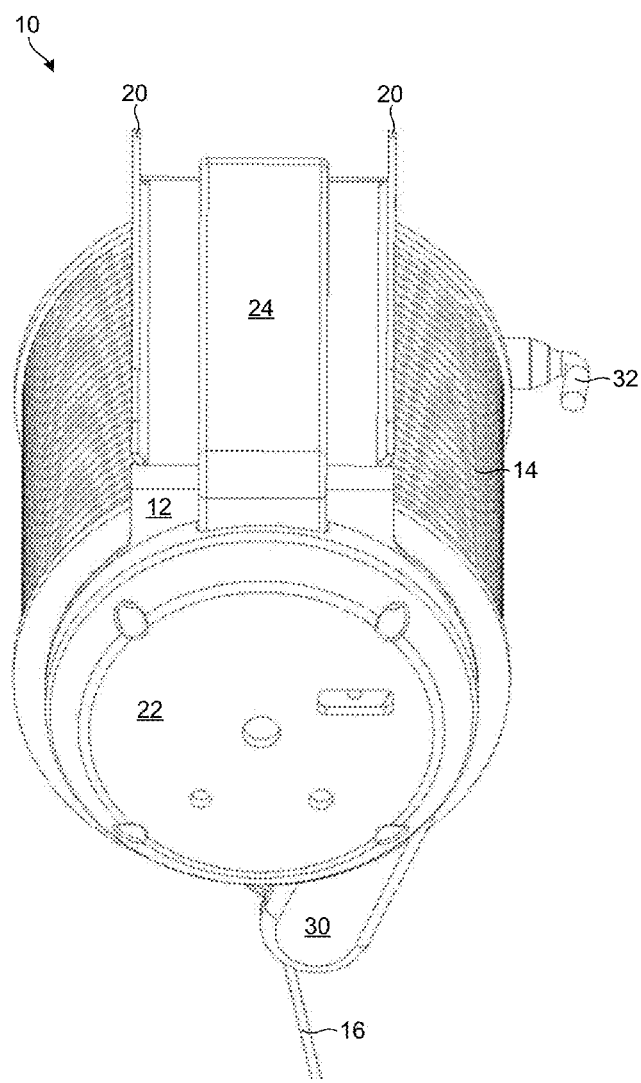
FIG. 3 is another alternative perspective view of the motorized lifting device illustrated in FIG. 1.

FIGS. 2 and 3 show the motorized lifting device 10 of FIG. 1 from two alternative vantage points. FIG. 1 shows the motorized lifting device 10 from an end housing the logistics electronics and FIG. 2 shows the motorized lifting device 10 from an end housing the power electronics. As shown in FIG. 2, the end housing the power electronics includes a cable 32 for supplying power thereto. The end also includes vents 34 for releasing heat generated by the motor and/or power electronics. FIG. 2 also provides a view of an underside of the passive guide 26 substantially conforming to a curvature of the grooved drum 14. FIG. 3 provides a top view of the motorized lifting device 10, particularly showing the cable 24 extending between the logistics electronics and power electronics on opposite sides of the drum 14.

Figure 4:
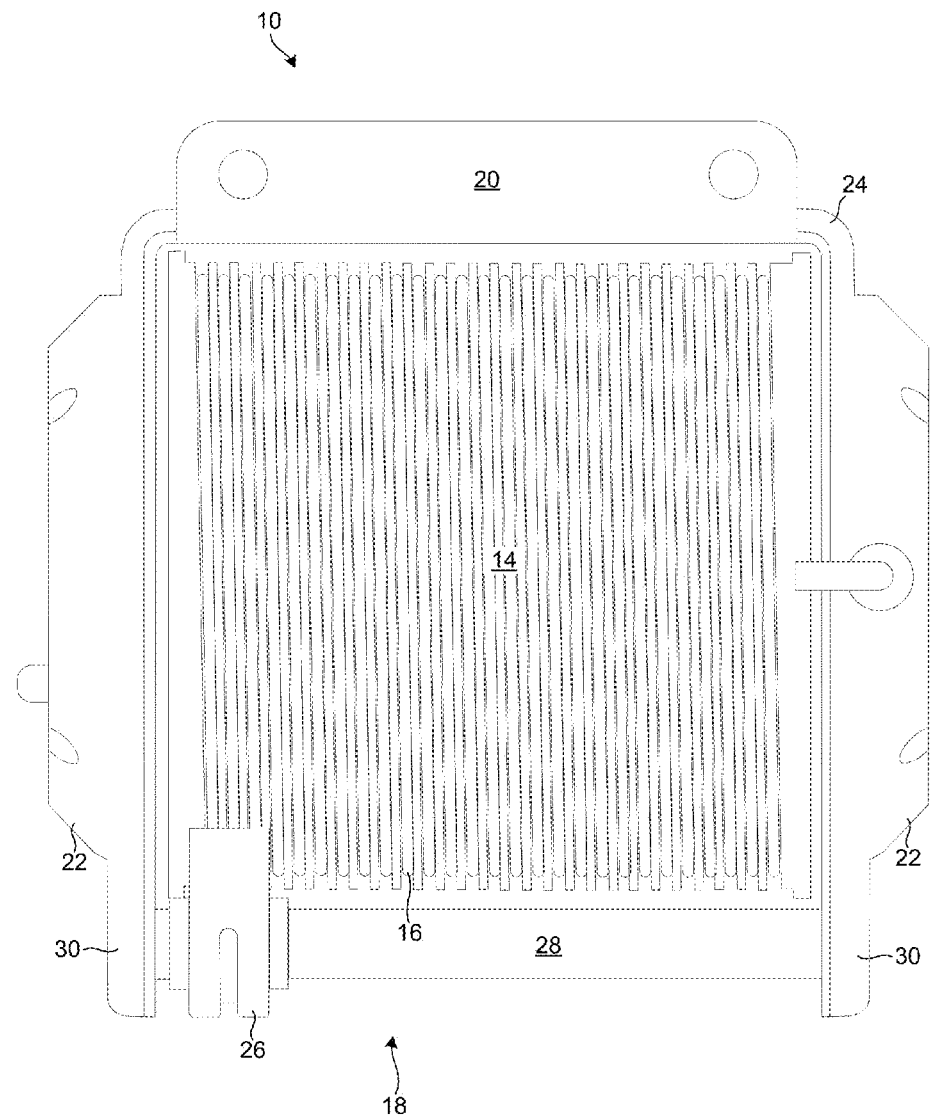
FIG. 4 is a side view of a motorized lifting device provided to show the grooved drum and line.

Referring to FIG. 4, a side view of the motorized lifting device 10 showing the grooved drum 14 and line 16 is illustrated. As previously mentioned, the drum 14 may include a continuous groove, such as a helical groove, around a circumference thereof. This groove may receive the line 16 and prevent the line 16 from winding over itself as the drum 14 rotates. To fit within the groove, the line 16 may be equal to or shorter than a length of the groove. Because the line 16 is situated in the groove and the radius of the drum 14 is known, the amount of line let out from or drawn into the motorized lifting device 10 may be precisely calculated from the angular position and number of rotations of the drum 14. Thus, the grooved drum 14 may enable precise calculations of how much line 16 is drawn in or let out from the motorized lifting device 10 at any given time.

As previously mentioned, the passive guiding mechanism 18 may rely on the grooved drum 14 to guide the line 16 into the groove. That is, as the drum 14 rotates, teeth or other surface features on the passive guide 26 may track the groove to move the passive guide 26 along the slide 28. This enables the passive guide 26 to precisely guide the line 16 into or out of the groove as the drum 14 rotates.

In certain embodiments, the groove is sized to grip the line 16 disposed therein. That is, the sides of the groove may be configured to press slightly against the line 16 in order to grip the line 16. Thus, in certain embodiments, the width of the groove is the same or slightly smaller than a diameter of the line 16. Furthermore, in order to grip the line 16, the groove may be configured to be at least as deep as a radius of the line 16. This will allow the sides of the groove to reach around and grip the sides of the line 16.

In other embodiments, the groove may be deeper than a radius of the line 16. This may provide a better grip on the line 16 as well as provide a surface to guide the passive guide 26. Thus, in certain embodiments the groove is deeper than a radius of the line 16. In yet other embodiments, the groove is at least as deep as a diameter of the line 16. In yet other embodiments, such as in the embodiment illustrated in FIG. 4, the groove is substantially deeper than a diameter of the line 16. This will allow the line 16 to fit entirely within the groove and still provide some groove depth to accommodate teeth or other surface features of the passive guide 26.

In certain embodiments, surfaces of the drum 14 or line 16 may be prepared, coated, or textured to provide the capabilities discussed above. For example, if the line 16 comprises a metal cable, the cable may be coated with a material such as rubber or plastic to enable better gripping. Similarly, the drum 14 may be fabricated from a material, or textured or coated with a material that provides an improved grip on the line 16. By contrast, other parts of the drum 14 may be configured to reduce friction. For example, upper sides of the groove or an outer surface of the drum 14 may be smoothed, lubricated, or the like to reduce friction between the passive guide 26 and the groove or drum 14.

Figure 5:
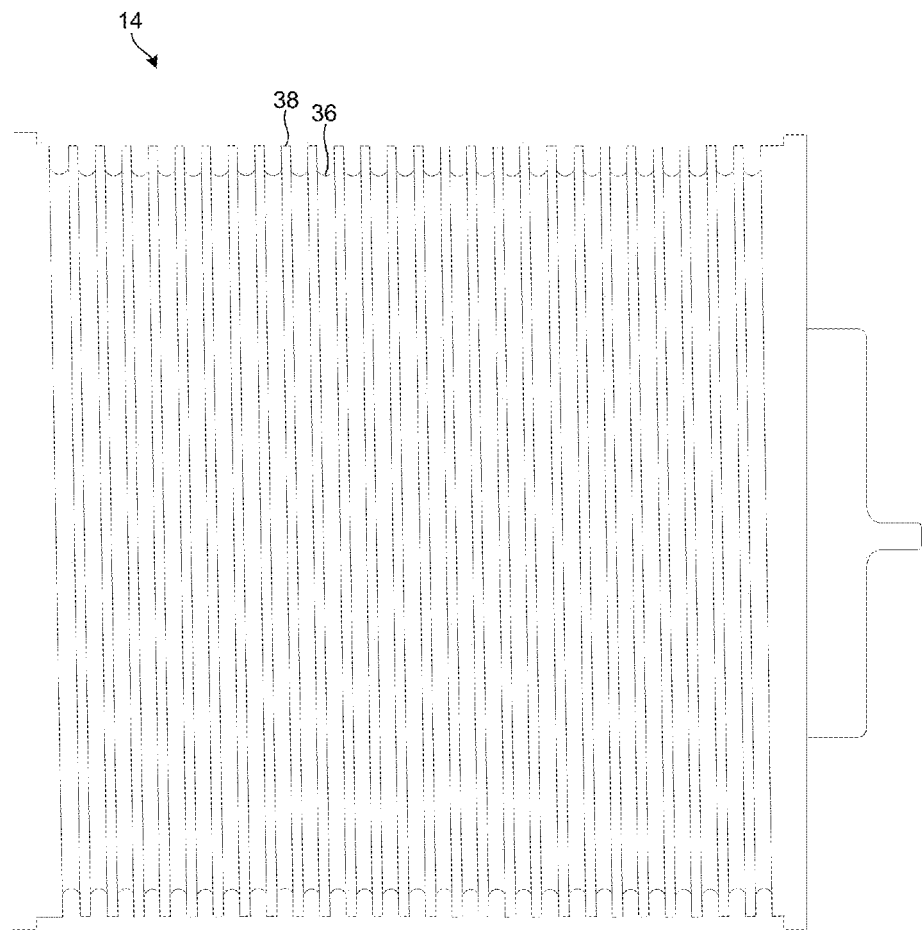
FIG. 5 is a side view of the grooved drum illustrated in FIG. 4.

Referring to FIG. 5, a side view of the grooved drum 14 illustrated in FIG. 4 is shown. As shown, the grooved drum 14 includes a groove 36, in this example a helical groove 36, around a circumference thereof. In this example, the groove 36 includes a curved bottom that roughly conforms to a curvature of the line 16, although this may not be necessary in all embodiments. A shoulder 38 resides on each side of the groove 36. As shown, assuming a line 16 has approximately the same width as the groove 36, the groove 36 is significantly deeper than a diameter of the line 16. This will ensure that the line 16 can fit entirely within the groove and still provide some groove depth to enable tracking of the passive guide 26.

Figure 6:
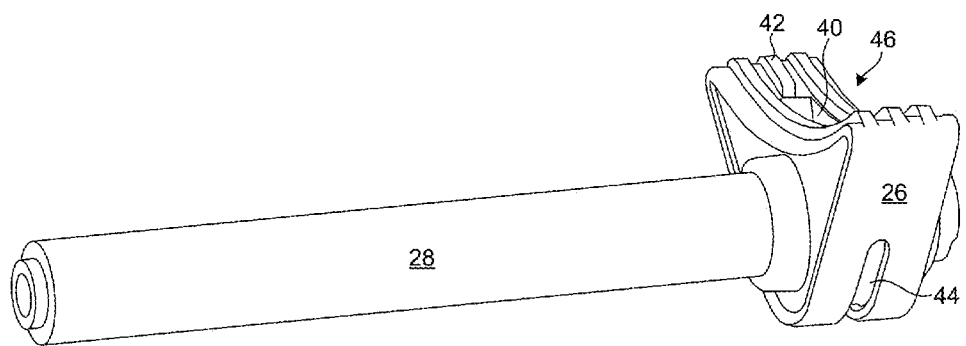
FIG. 6 is a perspective view of one embodiment of a passive guide to guide the line into the grooved drum.

Referring to FIG. 6, while also referring generally to FIG. 7, a perspective view of one embodiment of a passive guide 26 and slide 28 for guiding a line 16 into a grooved drum 14 is illustrated. As shown, the passive guide 26 has a curved surface 46 substantially conforming to a curvature of the grooved drum 14. This surface 46 includes a plurality of teeth 42 that ride in and track the groove 36. These teeth 42 also have a curvature that generally conforms to the curvature of the drum 14. In the illustrated embodiment, the passive guide 26 includes three teeth 42, with the center tooth 42 cut away to provide a passage 40 for the line 16.

The passive guide 26 includes an aperture 44 to accommodate and guide the line 16. The illustrated aperture 44 is elongate in the direction of the groove 36 to allow freedom of movement in the direction of the groove 36 while limiting movement transverse to the groove 36. This will ideally keep the line 16 aligned with the groove 36 and prevent the line 16 from jumping over a shoulder 38. In certain embodiments, rollers, bearings, rounded surfaces, or other friction-reducing components may be provided inside the aperture 44 to reduce friction on the line 16. Alternatively, the aperture 44 may include means to slightly grip the line 16 as it passes through the aperture 44. For example, a slight grip on the line 16 may keep the line 16 slightly tensioned around the drum 14, thereby preventing slack in the line 16 and possible unraveling. In certain embodiments, a set screw or other adjustment mechanism may be provided to set or adjust the grip on the line 16.

The amount of grip on the line 16 may be tuned to maintain tension around the drum 14 and prevent bunching of the line 16 when line 16 is let out from the motorized lifting device 10. Bunching may occur, for example, when line is let out from the motorized lifting device 10 but there is little or no weight at the end of the line 16. Thus, if a grip is too tight on the line 16, the line 16 may bunch around the drum 14 instead of passing through the aperture 44 as line 16 is let out. To prevent this, the amount of grip on the line 16 may be finely tuned. In certain embodiments, rigidity in the line 16, such as may exist with various types of wire cables (e.g., steel cables), may assist the line 16 in pushing through the slight grip to prevent bunching around the drum 14.

As shown, the slide 28 is circular, thereby allowing the passive guide 26 to rotate around the slide 28 absent any other constraints. However, the passive guide's curvature combined with its close proximity to the drum 14 (as shown in FIG. 7) will keep the passive guide 26 from rotating around the slide 28. Rather the passive guide 26 will be confined to lateral movement along the slide 28 as the passive guide 26 tracks the groove 36 of the drum 14.

Although a cross-section of the slide 28 is circular in the illustrated embodiment, the cross-section of slide 28 is not limited to circular cross-sections. Non-circular cross-sections may also be used in some embodiments. Such non-circular cross-sections may be able to prevent rotation of the passive guide 26 around the slide 28 without any other constraints, while still allowing the passive guide 26 to move laterally along the slide 28. Because additional constraints may be unneeded, the curved surface 46 of the passive guide 26 may be replaced with other surface types, including surfaces with a smaller surface area or non-curved surfaces.

Referring to FIG. 8, a cutaway side view of the passive guide 26 interfacing with the grooved drum 14 is illustrated. As shown in FIG. 8, the groove 36 is significantly deeper than a diameter of the line 16, thereby providing sufficient groove depth to accommodate the teeth 42 of the passive guide 26. Dotted circles 48 are provided to show the approximate space occupied by the line 16. The teeth 42 may fill any remaining space in the groove 36. One additional function provided by the teeth 42 is that they may push the line 16 into the groove 36, such as to the bottom of the groove 36. This may increase the accuracy of the motorized lifting device 10 since the amount of line 16 let out from the motorized lifting device 10 may be a function of the angular position of the drum 14, the number of rotations of the drum 14, and the radius of the drum 14. If the line 16 is not properly seated within the groove 36, the effective radius of the line 16 may differ from the radius of the drum 14. This may increase error and undermine the ability to accurately determine how much line is let out from the drum 14 at any given time.

Figure 9A:
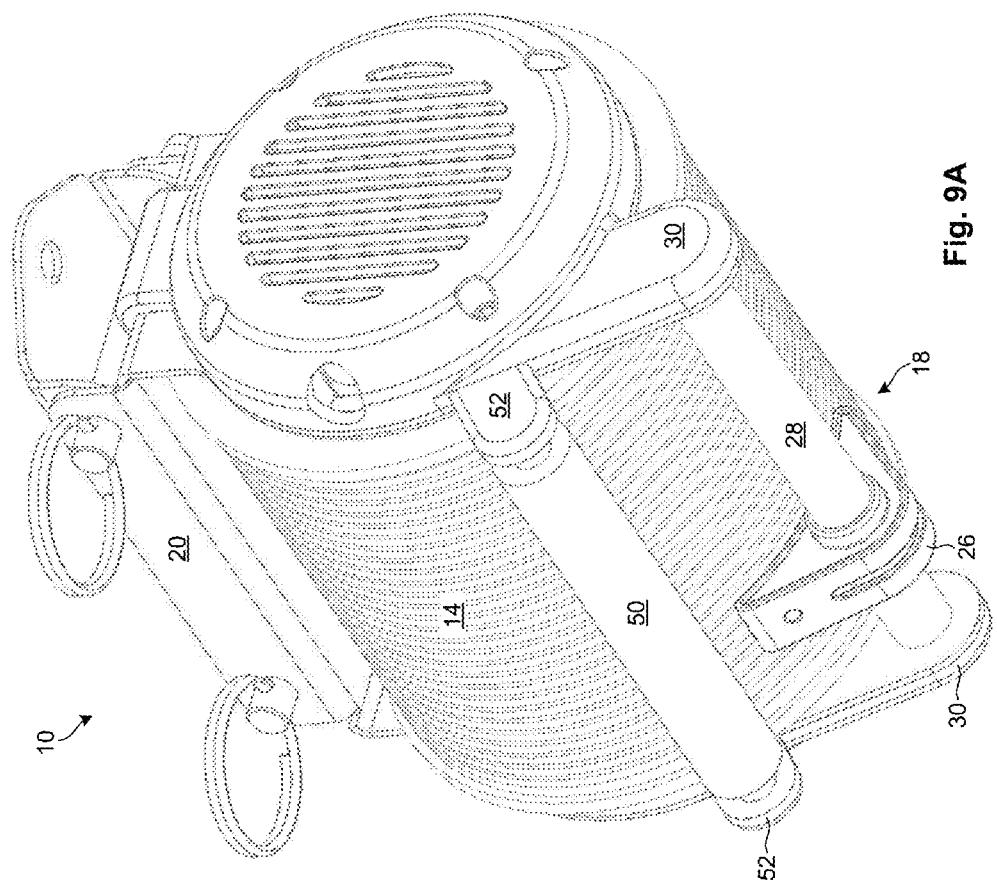
FIG. 9A is a perspective view of one embodiment of a motorized lifting device comprising a rolling mechanism to assist the passive guide in guiding line into the grooved drum.
Figure 9B:
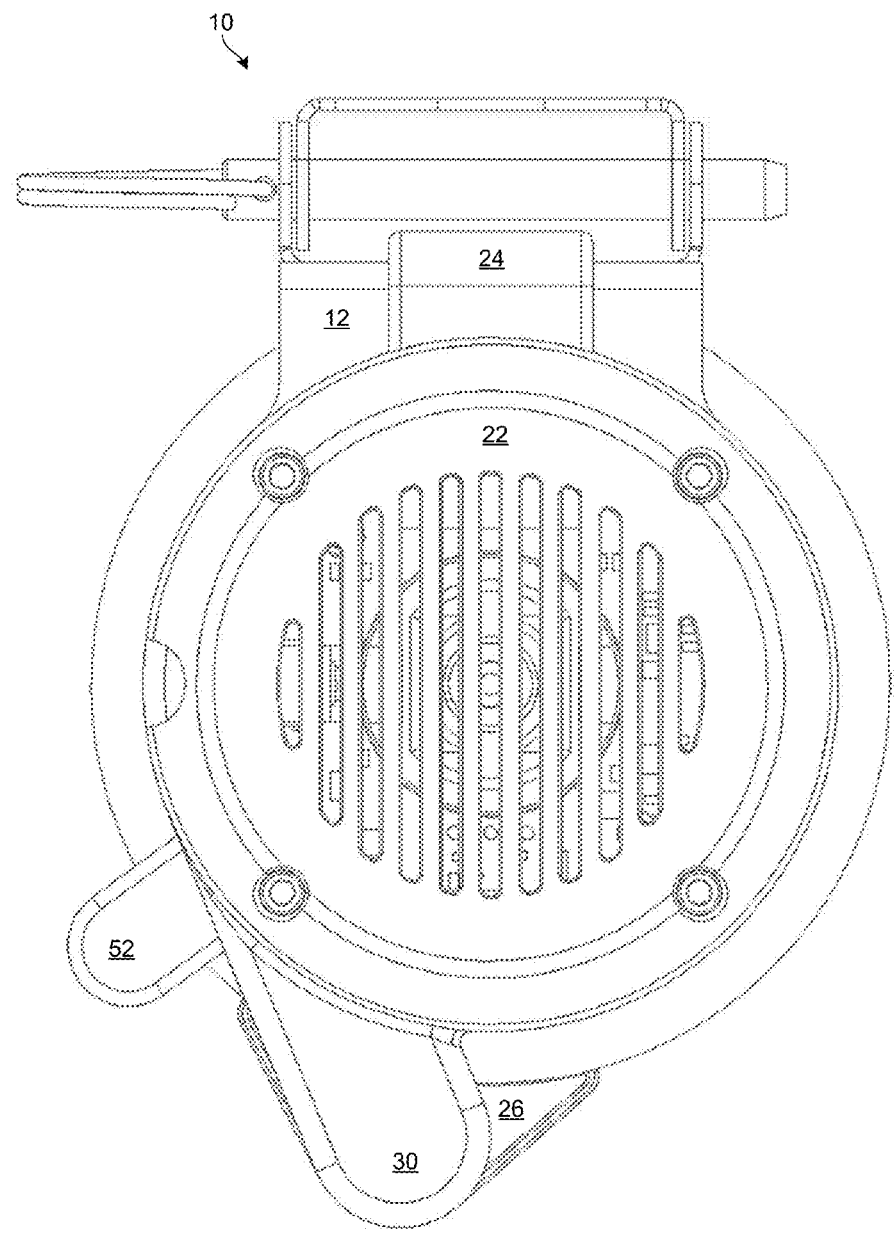
FIG. 9B is an end view of the motorized lifting device of FIG. 9A.

Referring to FIG. 9A, in certain embodiments, an additional roller 50 may provide assistance in keeping the line 16 in the groove 36. For example, the roller 50 may be configured to lead or trail the passive guiding mechanism 18 to ensure that the line 16 is retained in the groove 36 and to prevent the line 16 from unwinding, bunching, or tangling when little or no weight is attached to the end of the line 16. In certain embodiments, additional arms 52 may extend from the motorized lifting device 10 to hold the roller 50. The roller 50 illustrated in FIG. 9A is substantially smooth, meaning that it may not fully penetrate the groove 36 and/or not always make contact with the line 16 in the groove 36. Nevertheless, in certain embodiments, the roller 50 may be fabricated from a soft or deformable material such as rubber to somewhat penetrate the groove 36 as it presses thereagainst. In other embodiments, the roller 50 may be fabricated from a firm or inelastic material. FIG. 9B shows a side view of the motorized lifting device 10 of FIG. 9A.

Figure 10A:
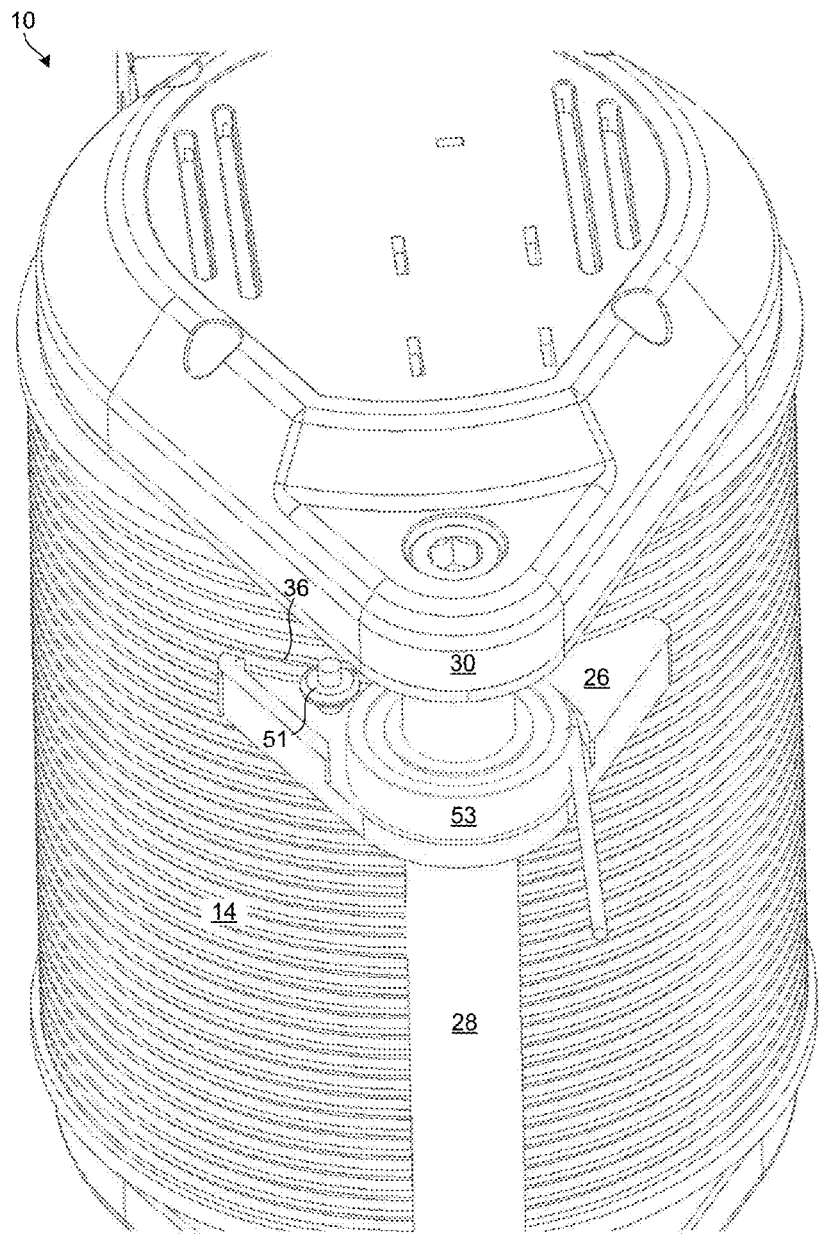
FIG. 10A is a perspective view of another embodiment of a rolling mechanism to assist the passive guide in guiding line into the grooved drum.
Figure 10B:
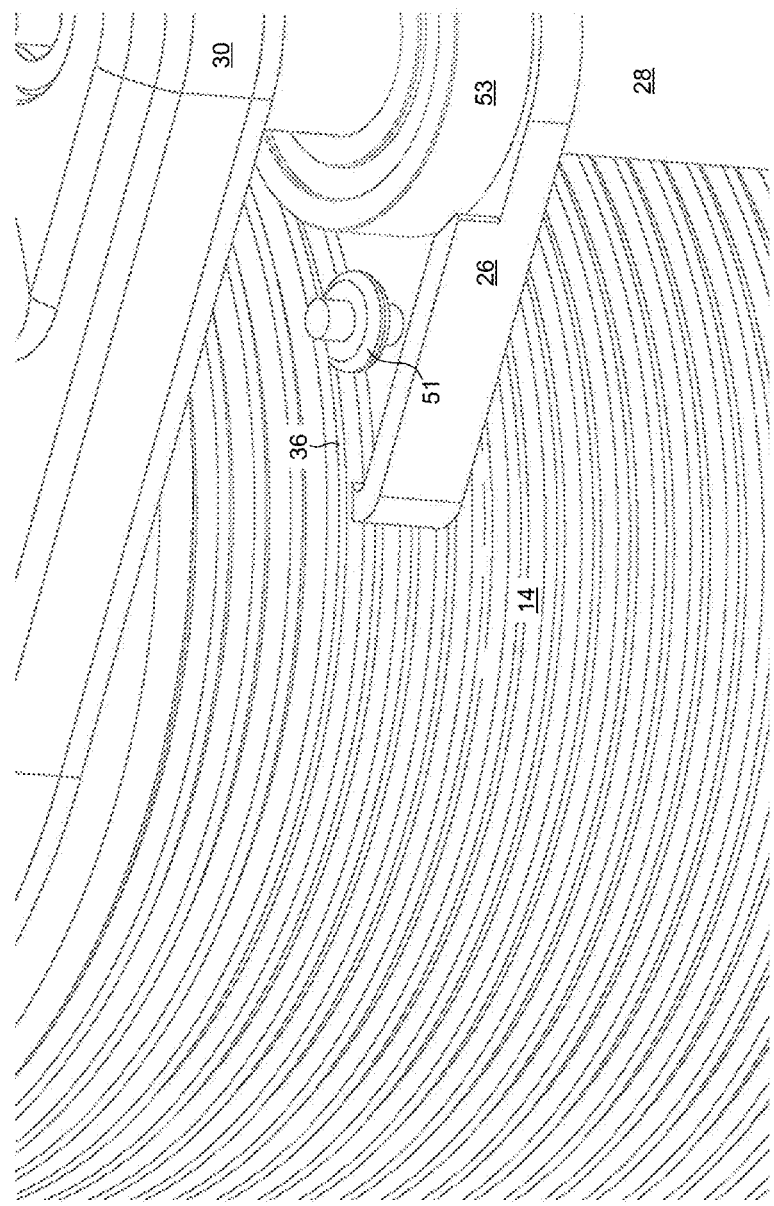
FIG. 10B is a close-up view of the rolling mechanism of FIG. 10A.

Referring to FIGS. 10A and 10B, another embodiment of a rolling mechanism is illustrated. In this embodiment, instead of extending the length of the drum 14, like the roller 50 described in FIGS. 9A and 9B, a roller 51 may be narrow enough to fit or at least partially fit within the groove 36. This allows the roller 51 to extend into the groove 36 and thereby push the line 16 into the groove 36. This may also help to ensure that the line 16 is fully seated in the groove 36. Such a feature may be particularly beneficial in cases where the groove 36 is slightly narrower than the line 16 or exerts a slight grip on the line 16, since some force or urging may be needed to fully seat the line 16 in the groove 36. This feature may also improve the precision of the motorized lifting device 10, since seating the line 16 in the groove 36 may be important to accurately determine how much line 16 is let out at any given time. Ensuring the line 16 is fully seated in the groove 36 ensures that the effective radius of the drum 14 is substantially equal to its actual radius.

As shown in FIGS. 10A and 10B, in certain embodiments, the roller 51 may be incorporated into the passive guide 26. This will enable the roller 51 to move with the passive guide 26 along the slide 28, thereby allowing the roller 51 to track and follow the helical groove 36. The roller 51 may also provide a benefit when letting out line 16 from the drum 14, particularly when there is little or no weight attached to the end of the line 16. When letting out line 16, the line 16 has the potential to unwind or bunch on the drum 14 since little or no weight is present to pull the line 16 through the passive guide 26. In other words, the line 16 may unwind around the drum 14 instead of feeding through the passive guide 26. The roller 51 may help to prevent such a problem by keeping the line 16 positioned or pressed against a bottom of the groove 36 while the line 16 is being let out.

Also worth noting in FIGS. 10A and 10B is a wheel 53 or bearing 53 within the passive guide 26. As previously mentioned, rollers, bearings, rounded surfaces, or other friction-reducing components may be provided inside the passive guide 26 to reduce friction when drawing in or letting out the line 16. FIGS. 10A and 10B show one example of such a wheel 53 or bearing 53. In certain embodiments, this wheel 53 or bearing 53 may assist in pushing the line 16 into the groove 36 as well as retaining the line 16 in the groove 36 once inside.

Figure 11:
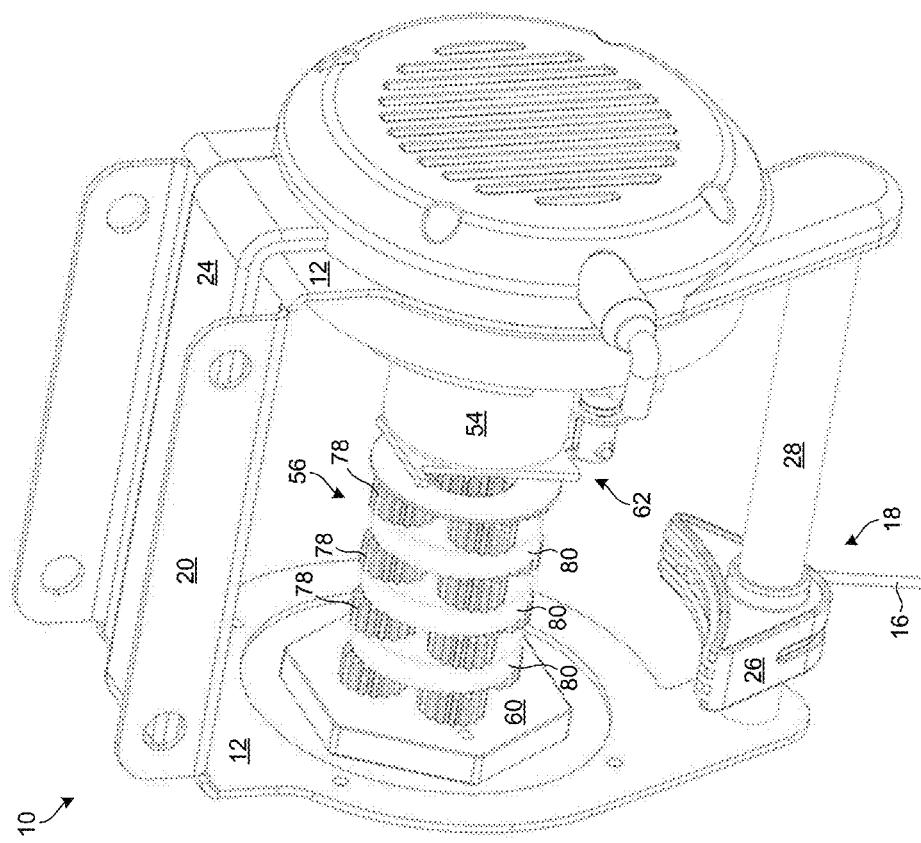
FIG. 11 is an internal view of one embodiment of a motorized lifting device with various components removed to facilitate viewing of other internal components.
Figure 12:
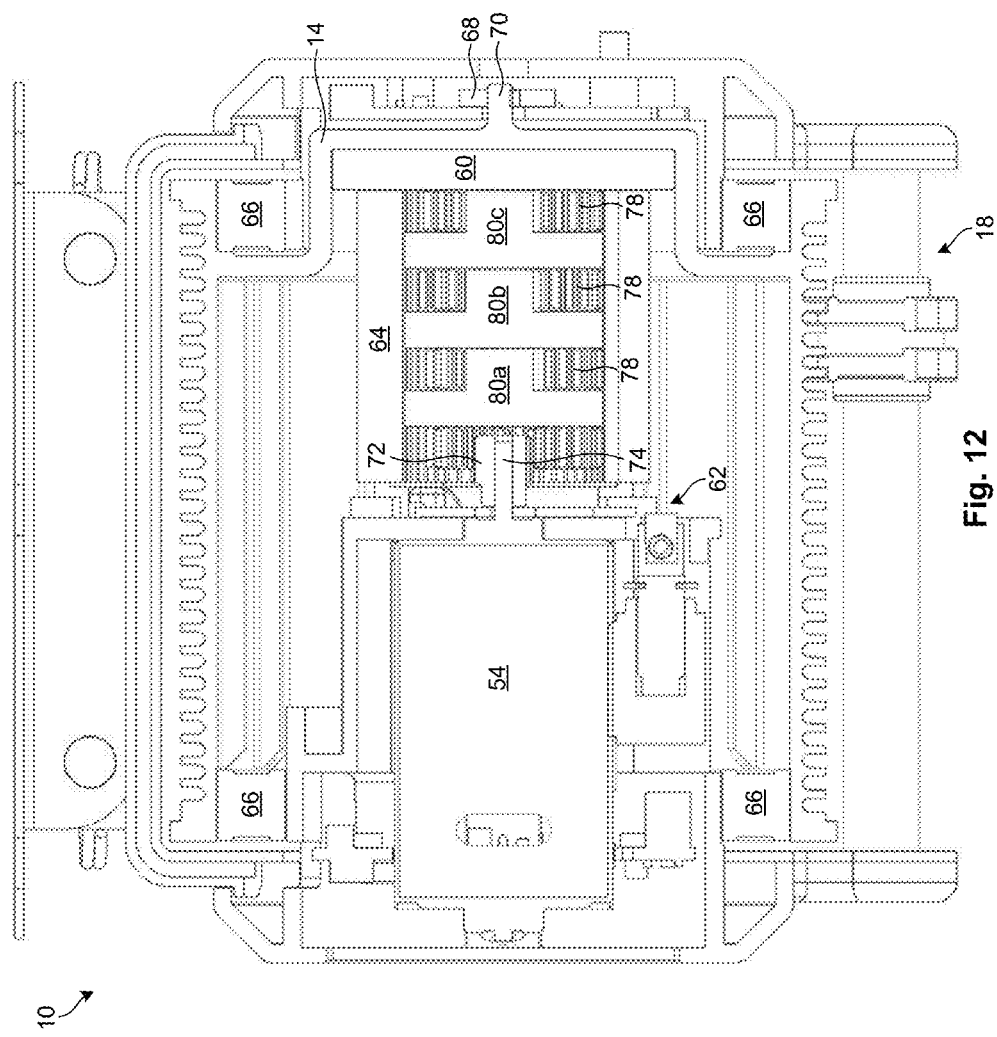
FIG. 12 is a cutaway side view of a motorized lifting device showing various internal components.
Figure 13:
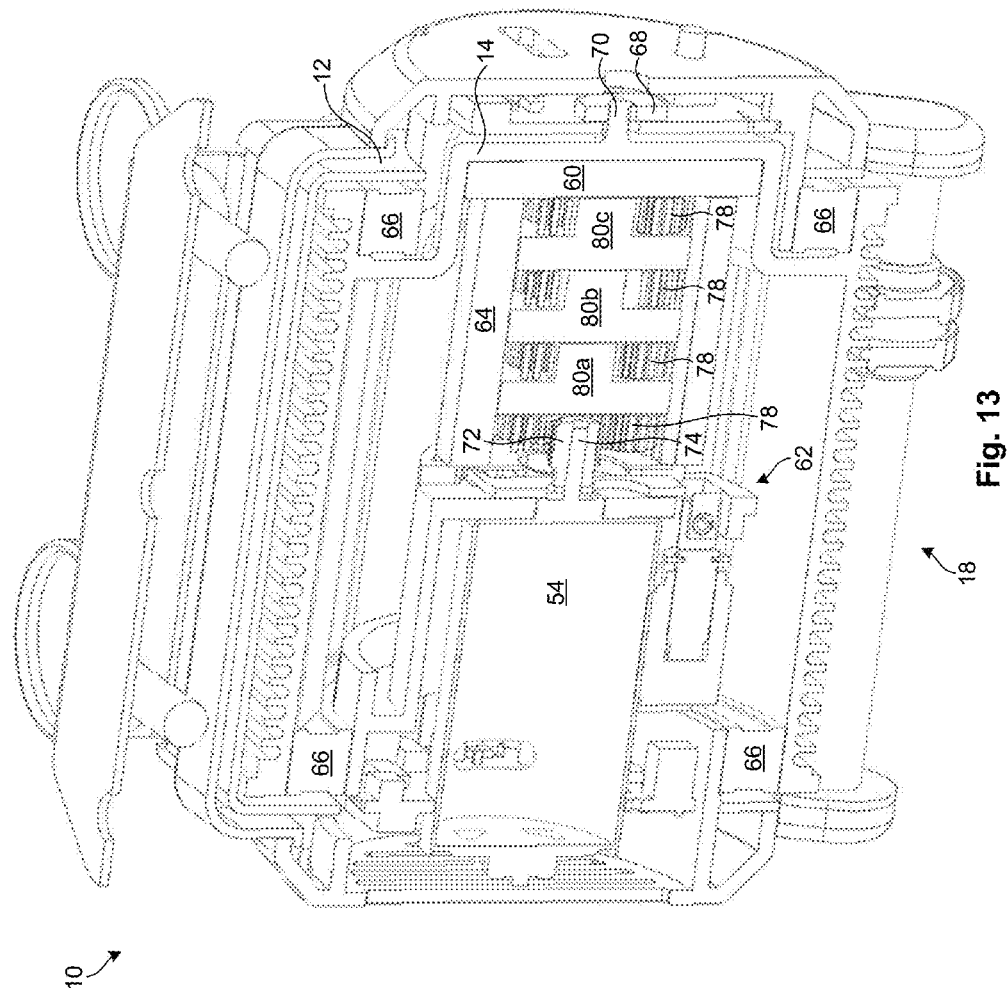
FIG. 13 is a cutaway perspective view of a motorized lifting device showing various internal components.

Referring to FIGS. 11 through 13, several internal views of a motorized lifting device 10 in accordance with the invention are provided. FIG. 11 is an internal view of a motorized lifting device 10 showing a motor 54, locking mechanism 62, and gearbox 56 (also referred to as a transmission 56). Selected components, such as the drum 14, bearings 66, and ring gear 64 of the gearbox 56 have been removed from FIG. 11 to facilitate viewing of other internal components. FIG. 12 is a cutaway side view of the motorized lifting device 10 showing internal components. FIG. 13 is a cutaway perspective view of the motorized lifting device 10 also showing internal components.

As shown in FIGS. 11 through 13, a motorized lifting device 10 in accordance with the invention includes a motor 54 to provide a rotational force or torque. In certain embodiments, the motor is a direct current (DC) motor, such as a low voltage DC motor, although other types of motors may also be used. The motor 54 may be coupled to a gearbox 56 to reduce the gear ratio of the motor. In the illustrated embodiment, an output shaft 74 of the motor 54 is coupled to a pinion 72, which in turn drives the gearbox 56. An output hex 60 (or other shape) may act as an output shaft of the gearbox 56 to drive the drum 14. In the illustrated example, the gearbox 56 is a planetary gearbox 56 comprising multiple stages of planet carriers/pinions 80 and planetary gears 78. These stages of planet carriers/pinions 80 and planetary gears 78 rotate within a ring gear 64 to reduce the gear ratio of the motor 54. Each successive stage of planetary gears 78 may reduce the gear ratio by a selected amount in accordance with the principles governing planetary gears.

For example, assume that each stage of planetary gears 78 reduces the gear ratio by five. In such a scenario, the planet carrier/pinion 80a may rotate fives times slower than the pinion 72 (which is directly coupled to the motor 54); the planet carrier/pinion 80b may rotate twenty-five (i.e., $5^2$) times slower than the pinion 72; the planet carrier/pinion 80c may rotate one hundred and twenty-five (i.e., $5^3$) times slower than the pinion 72; and the output hex 60 (also acting as a planet carrier 60 and output shaft of the gearbox 56) may rotate six hundred and twenty-five (i.e., $5^4$) times slower than the pinion 72. Thus, in this example, the gearbox 56 rotates the drum 14 a single time for every six hundred and twenty-five rotations of the motor 54. This represents one example of a gear ratio for a gearbox 56 and is not intended to be limiting. Other gear box designs and gear ratios are possible and within the scope of the invention. One of ordinary skill in the art will recognize that the relative sizes of the pinions 72, 80a, 80b, 80c and planetary gears 78 may be varied as well as the number of stages to alter the gear ratio.

One notable feature of the illustrated motorized lifting device 10 is that the motor 54 and gearbox 56 are substantially entirely contained within the drum 14. This substantially reduces the size of the motorized lifting device 10. This, in turn, may increase a number of applications for the motorized lifting device 10, particularly applications where compactness is desired or required.

Another notable feature of the illustrated motorized lifting device 10 is the output hex 60. Instead of using an output shaft, like most gearboxes or transmissions, the illustrated motorized lifting device 10 uses an output hex 60 to drive the drum 14. The output hex 60 also functions as a planet carrier for the last stage of planetary gears 78. In other words, the output hex 60 may include pins (now shown) that enable rotation of the last stage of planetary gears 78. The drum 14 includes a corresponding hex-shaped recess into which the output hex 60 fits, thereby enabling the output hex 60 to apply a torque to the drum 14. In other words, the output hex 60 may act as a key and the drum 14 may provide a socket into which the key fits. The hex shape of the output hex 60 ensures that the output hex 60 stays rotationally locked relative to the drum 14. Although, the output hex 60 is hexagonally shaped in the illustrated embodiment, other shapes are also possible and within the scope of the invention, as long as the selected shape has the ability to lock with a corresponding recess in the drum 14.

Another notable feature of the motorized lifting device 10 is the use of a common bearing 66 to support the gearbox 56 and the drum 14. This eliminates the need to have a separate bearing 66 for the gearbox 56 and the drum 14. The bearing 66 supports any load placed on the drum 14 while preventing such load from being placed on gears of the gearbox 56. This will ideally prevent wear, binding, or misalignment of the gears of the gearbox 56. In the illustrated embodiment, the motorized lifting device 10 has a bearing 66 at each end of the motorized lifting device 10 to enable rotation of the drum 14. No additional bearings are needed for the gearbox 56.

In certain embodiments in accordance with the invention, a short post 70 may be incorporated onto the drum 14 or another rotating member for use with an absolute position encoder 68, such as a resistive encoder 68. Such an encoder 68 may be used to measure a rotational angle of the drum 14 relative to the rest of the motorized lifting device 10. The encoder 68 may rotate with the post 70. Thus, in certain embodiments, the post 70 may include a keyed shape (such as a "D" shape) that fits into a corresponding shape in the encoder 68. This fixes the encoder 68 to the drum 14 and allows the encoder 68 to rotate with the drum 14. The electrical resistance of the encoder 68 may vary around its circumference. A sensor measures the resistance of the encoder 68 as it rotates, thereby allowing the rotational angle of the encoder 68 and drum 14 to be determined. The output of a resistive encoder 68 and the manner in which the output may be used to determine angular position will be discussed in association with FIGS. 35A and 35B.

In other embodiments, a magnetic encoder (not shown) may be used to measure a rotational angle of the drum 14. For example, the post 70 may be replaced with a diametrically polarized magnet that rotates with the drum 14. The magnet's rotational position may be monitored by a magnetic resolver. Such an embodiment may be advantageous in that no mechanical shaft may be required to turn a physical wiper, as may occur in a resistive encoder. Rather, the angular position may be magnetically communicated to a contactless sensor proximate thereto. Also, unlike a resistive encoder, a magnetic encoder may have no "dead band," a concept that will be discussed in more detail in association with FIG. 35C. In other embodiments, other types of absolute position encoders (e.g., optical encoders, inductive encoders. etc.) may be used with the invention. In yet other embodiments, a relative position encoder may also be used. For example, if position data (e.g., angular position, number of rotations, etc.) is regularly stored in non-volatile memory, the position data may be retrieved from the non-volatile memory after a power outage or other significant event. The relative position encoder may then be used to measure position relative to the retrieved position data.

Both the resistive and magnetic encoders are considered absolute position encoders 68. Most existing techniques for measuring angular position utilize limit switches to indicate an end of travel and/or use relative position encoders. These techniques typically require a calibration point to establish a reference from which relative distance may be calculated. This means that if power is interrupted, calibration will once again be required. Also, any movement that occurs while the relative encoder is powered down will not be detected with a relative encoder. An absolute position encoder 68 differs from a relative encoder in that changes in angular position may be detected even when such changes occur during a power interruption.

Figure 14:
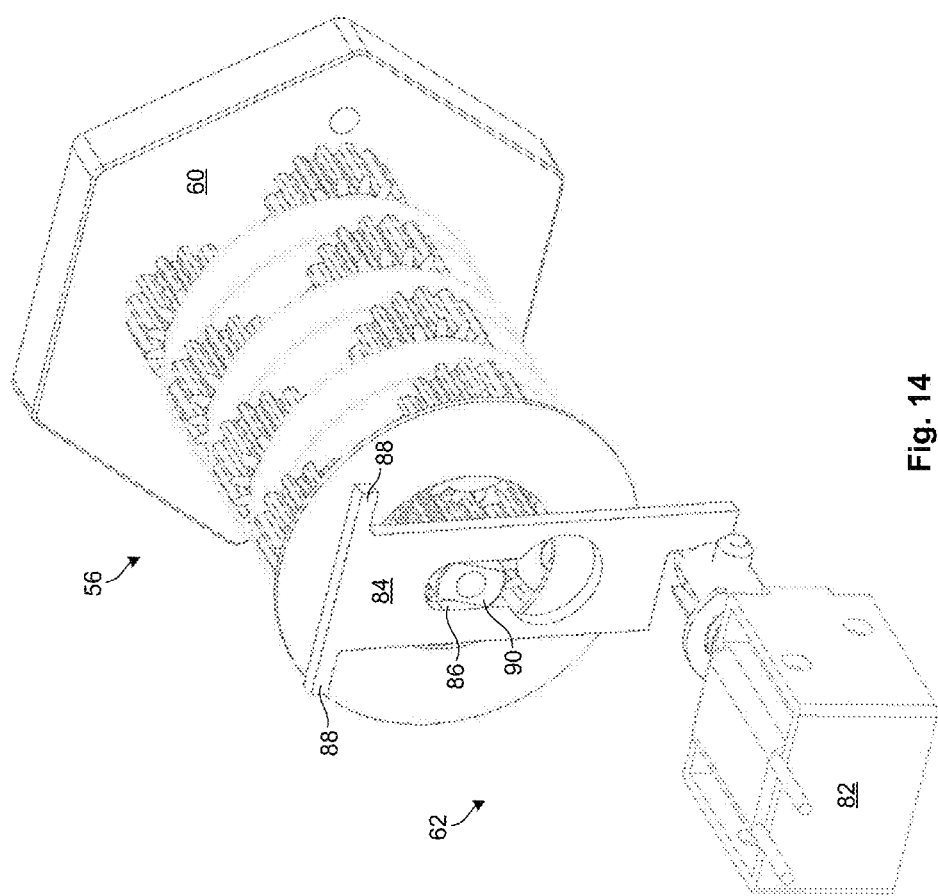
FIG. 14 is an internal perspective view of one embodiment of a locking mechanism in accordance with the invention.
Figure 15:
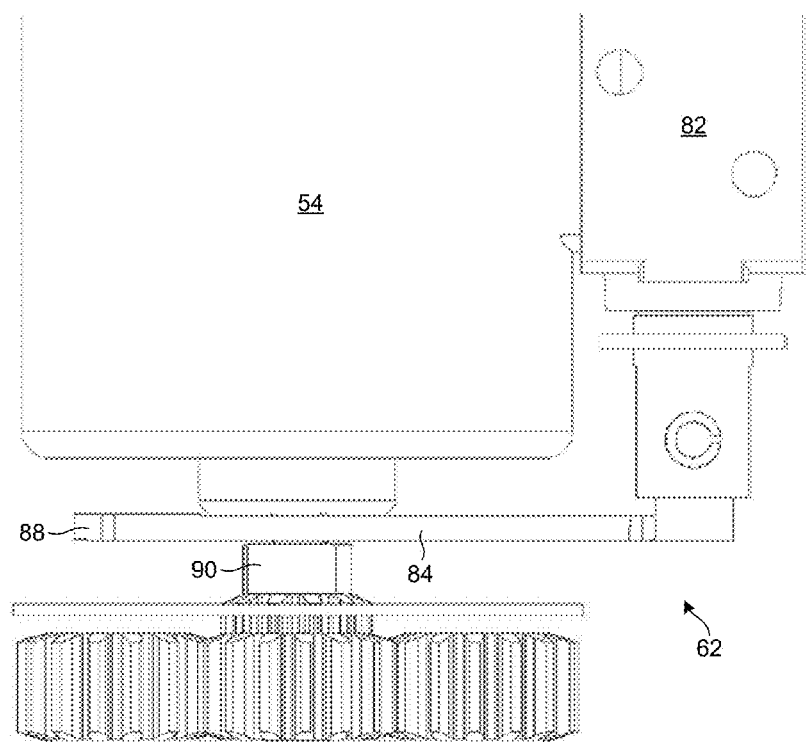
FIG. 15 is a cutaway top view of the locking mechanism illustrated in FIG. 14 when the locking mechanism is disengaged.
Figure 16:
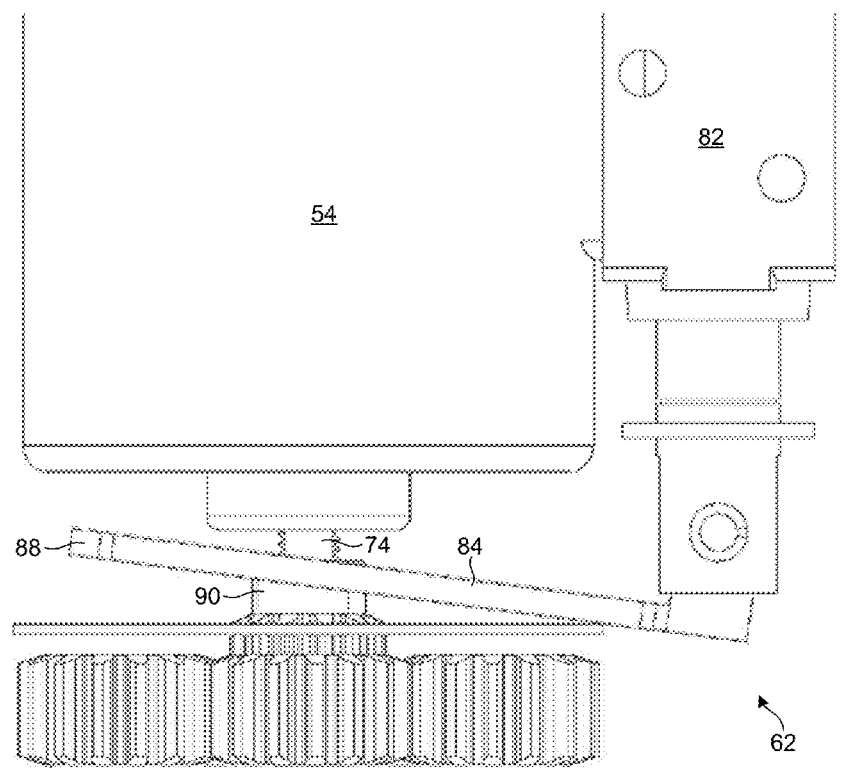
FIG. 16 is a cutaway top view of the locking mechanism illustrated in FIG. 14 when the locking mechanism is engaged.

Referring to FIGS. 14 through 16, several different views of a locking mechanism 62 in accordance with the invention are illustrated. As previously mentioned, in certain embodiments, a locking mechanism 62 may be provided to prevent rotation of the drum 14, such as when the motorized lifting device 10 stops or shuts down due to a power outage or an overload condition. Such a locking mechanism 62 may be an important safety feature of the motorized lifting device 10, as well as enable other precision- and control-related features and functions of the motorized lifting device 10. In certain embodiments, the locking mechanism 62 is locked by default, meaning that if the motorized lifting device 10 is powered down or not actively rotating the drum 14, the locking mechanism 62 engages to prevent rotation of the drum 14.

In certain embodiments, the locking mechanism 62 may be configured to lock a shaft 74 of the motor 54 or a member 90 directly connected to the shaft of the motor 54. Because the motor 54 may have a much higher gear ratio than the drum 14, locking the shaft 74 of the motor 54 may require considerably less force than directly locking or stopping the drum 14. For example, if a single turn of the drum 14 requires six hundred and twenty-five turns of the motor 54, then the amount of torque experienced by the motor 54 will be $1/625^{th}$ of that experienced by the drum 14, assuming friction in the gearbox 56 and other locations is not taken into consideration. As a result, locking the shaft 74 of the motor 54 may be considerably easier than locking the drum 14 directly. Its follows that a considerably lighter device may be used to lock the shaft 74 of the motor 54 than would be needed to directly lock or stop the drum 14.

Thus, the locking mechanism 62 illustrated in FIGS. 14 through 16 directly locks the shaft 74 of the motor 54 instead of locking or stopping the drum 14. As shown in FIG. 14, in one embodiment such a locking mechanism 62 may include an actuator 82 (e.g., solenoid) and a lever 84 comprising a shaped aperture 86. The shaped aperture 86 may be configured to interface with and lock a shaped feature on the shaft 74, or a shaped feature on a component 90 connected to the shaft 74. The actuator 82 may toggle the lever 84 between a first position that locks the shaft 74 and a second position that unlocks the shaft 74. A pair of arms 88 incorporated into the lever 84 may provide an axis along which the lever 84 pivots.

In the illustrated embodiment, a pair of flat surfaces are formed on a component 90 attached to the motor shaft 74. The shaped aperture 86 may engage the flat surfaces to prevent rotation of the shaft 74, similar to the way a wrench prevents rotation of a nut or bolt. In certain embodiments, the shaped aperture 86 may be made substantially larger than the shaped feature 90 to provide some flexibility for the shaped aperture 86 to slide over the shaped feature 90, while still being small enough to lock the shaped feature 90. To lock the shaft 74, the actuator 82 moves the shaped aperture 86 over the shaped feature 90. To unlock the shaft 74, the actuator 82 moves the shaped aperture 86 away from the shaped feature 90. FIG. 15 shows the position of the lever 84 when the shaft 74 is unlocked and FIG. 16 shows the position of the lever 84 when the shaft is locked.

Referring to FIGS. 17 through 22, another embodiment of a locking mechanism 62 in accordance with the invention is illustrated. In this embodiment, the locking mechanism 62 is positioned on the non-driving end of the motor 54. In other words, a first end of the motor shaft 74 may drive the gearbox 56 while the other end of the motor shaft 74 may interface with the locking mechanism 62. In other embodiments, the locking mechanism 62 may be positioned on the driving end of the motor 54.

In the illustrated embodiment, an actuator 82 moves a locking plate 92 between a locked and unlocked position. The locking plate 92 includes an aperture 94 comprising a locking portion and an unlocking portion. The aperture 94 may interface with a shaped feature 90 on or connected to the shaft 74. When the locking plate 92 is moved to the locked position, the locking portion of the aperture 94 slides over the shaped feature 90 to prevent rotation of the shaft 74. Similarly, when the locking plate 92 is moved to the unlocked position, the unlocking portion of the aperture 94 slides over the shaped feature 90 to allow rotation of the shaft 74. As shown in the Figures, the locking plate 92 slides in a plane substantially perpendicular to the shaft 74.

Figure 17:
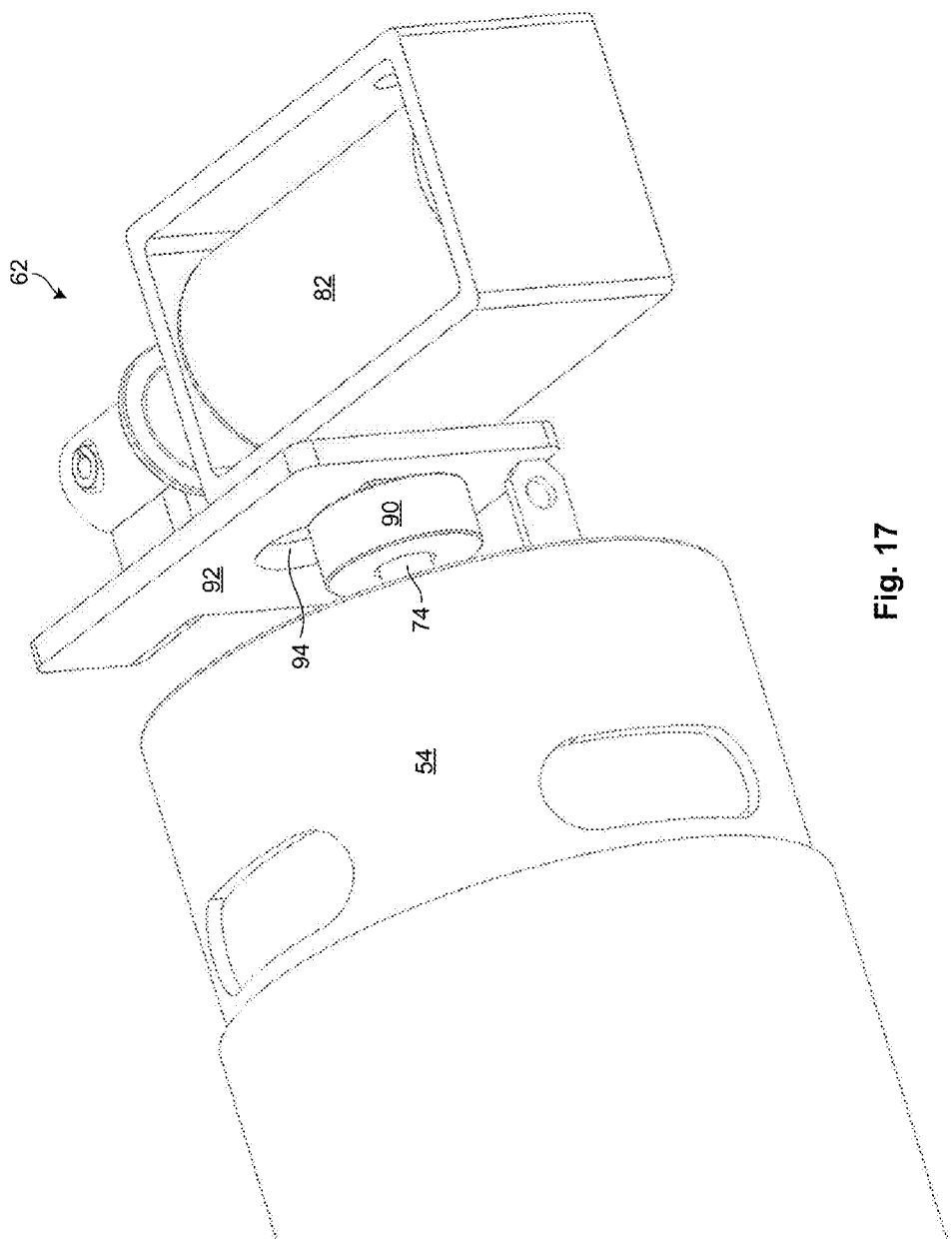
FIG. 17 is an internal perspective view of another embodiment of a locking mechanism in accordance with the invention, with the locking mechanism engaged.
Figure 18:
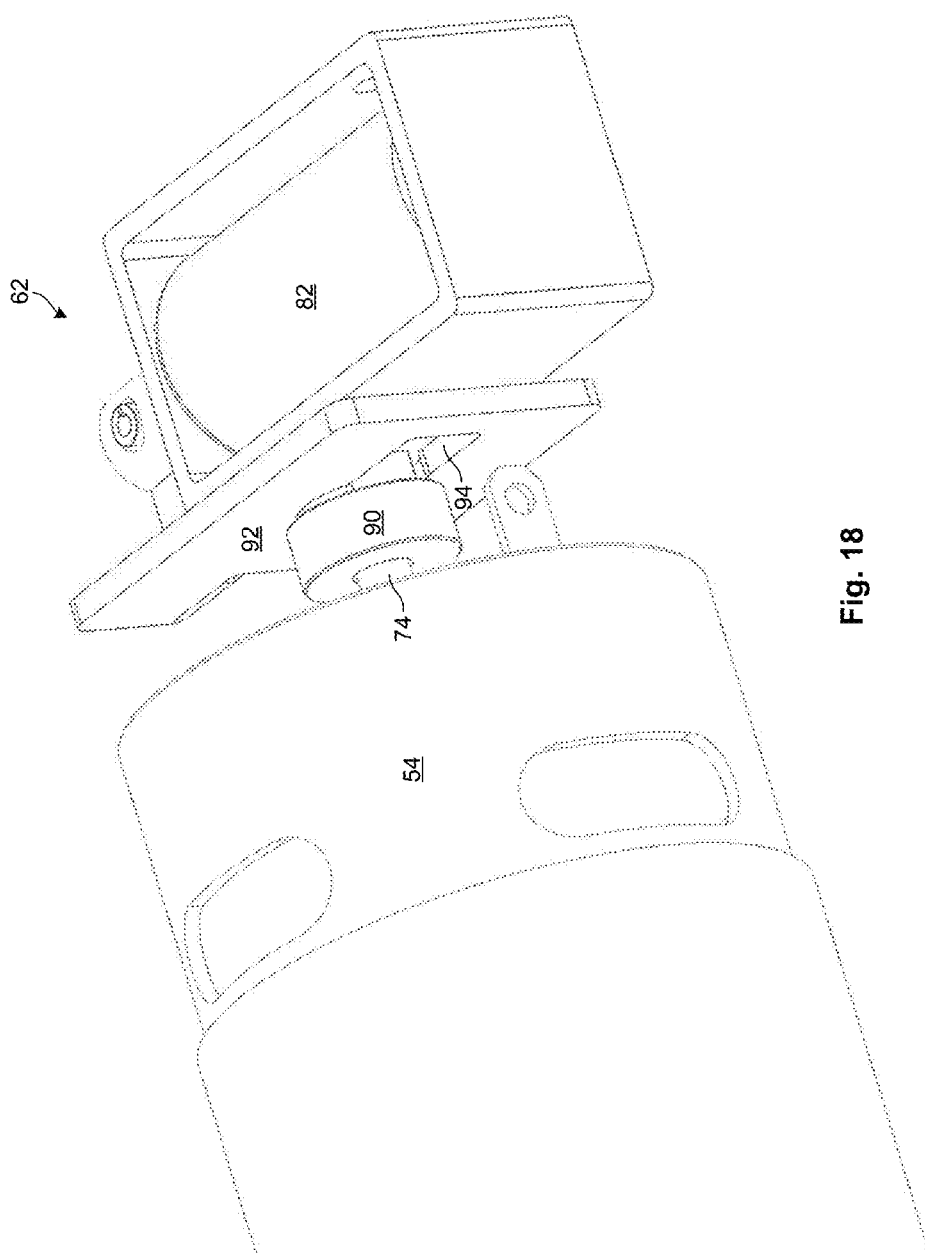
FIG. 18 is an internal perspective view of the locking mechanism of FIG. 17 with the locking mechanism disengaged.
Figure 19:
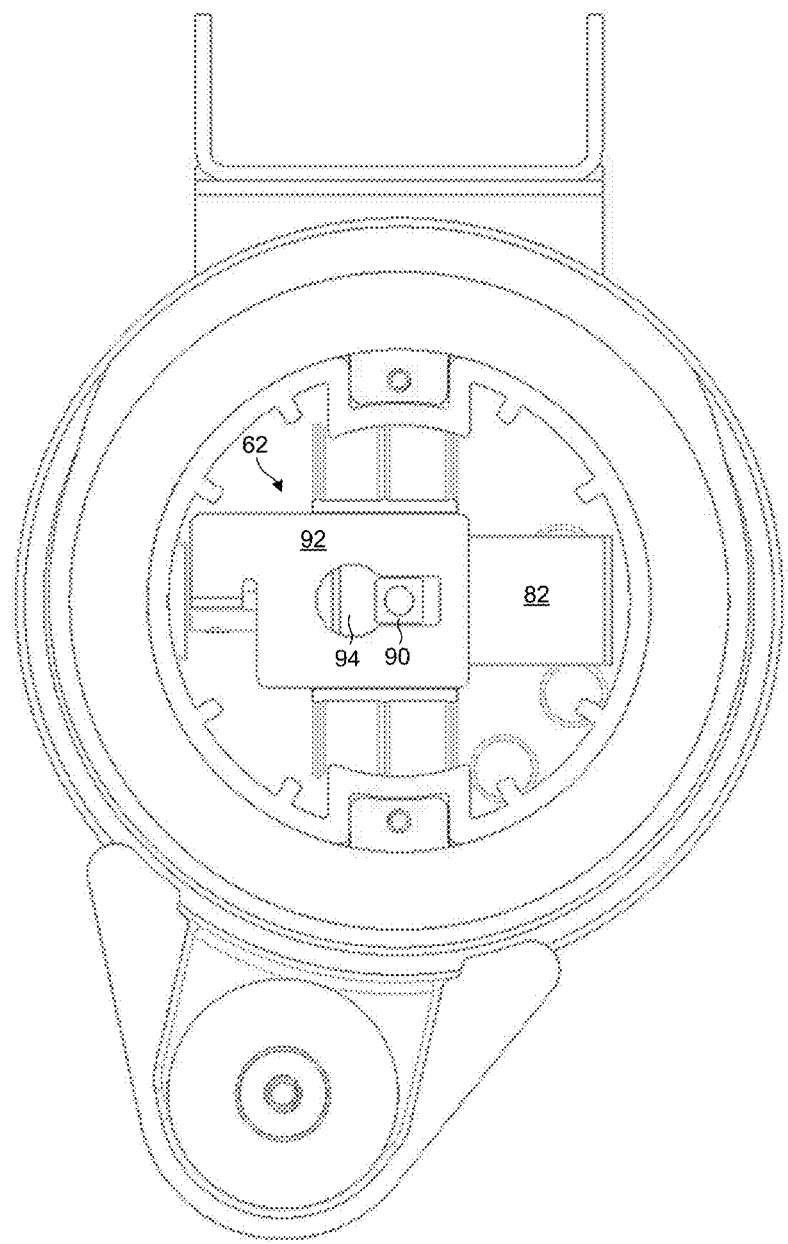
FIG. 19 is a side view of the locking mechanism of FIG. 17 with the locking mechanism engaged.
Figure 20:
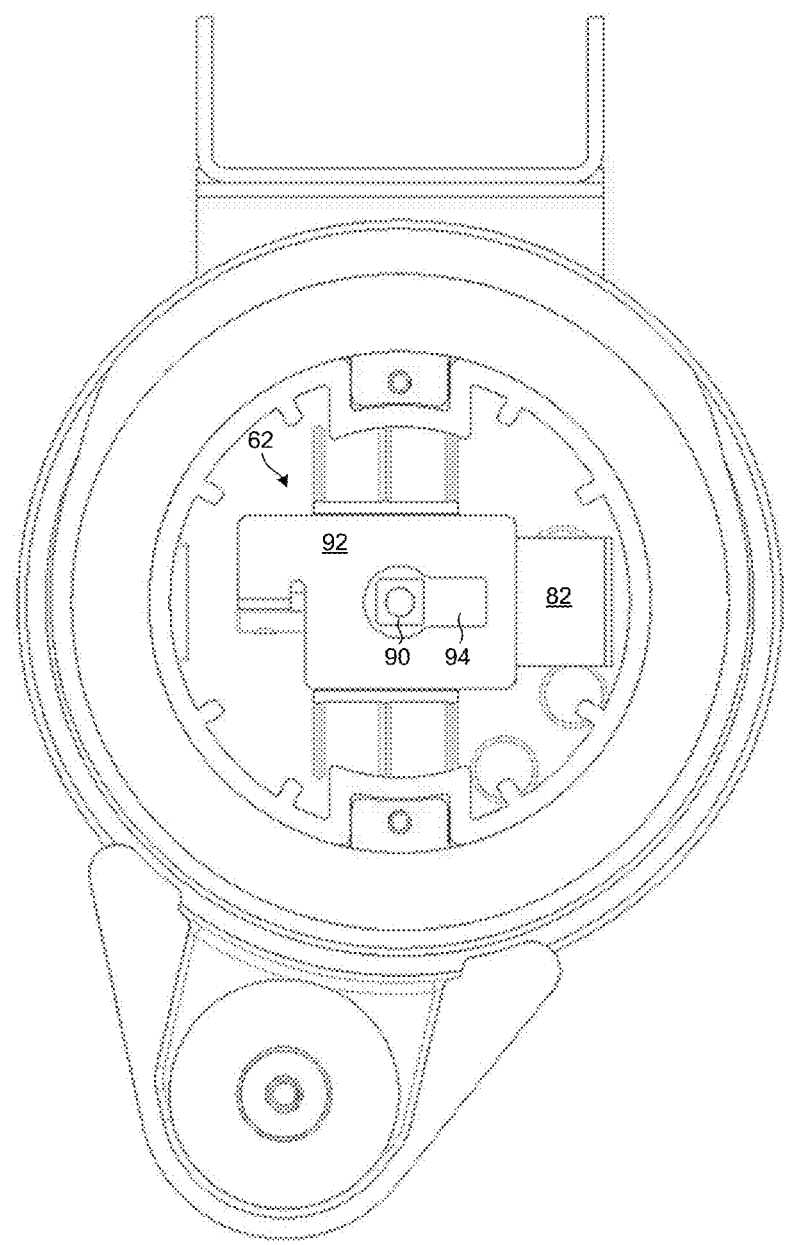
FIG. 20 is a side view of the locking mechanism of FIG. 17 with the locking mechanism disengaged.
Figure 21:
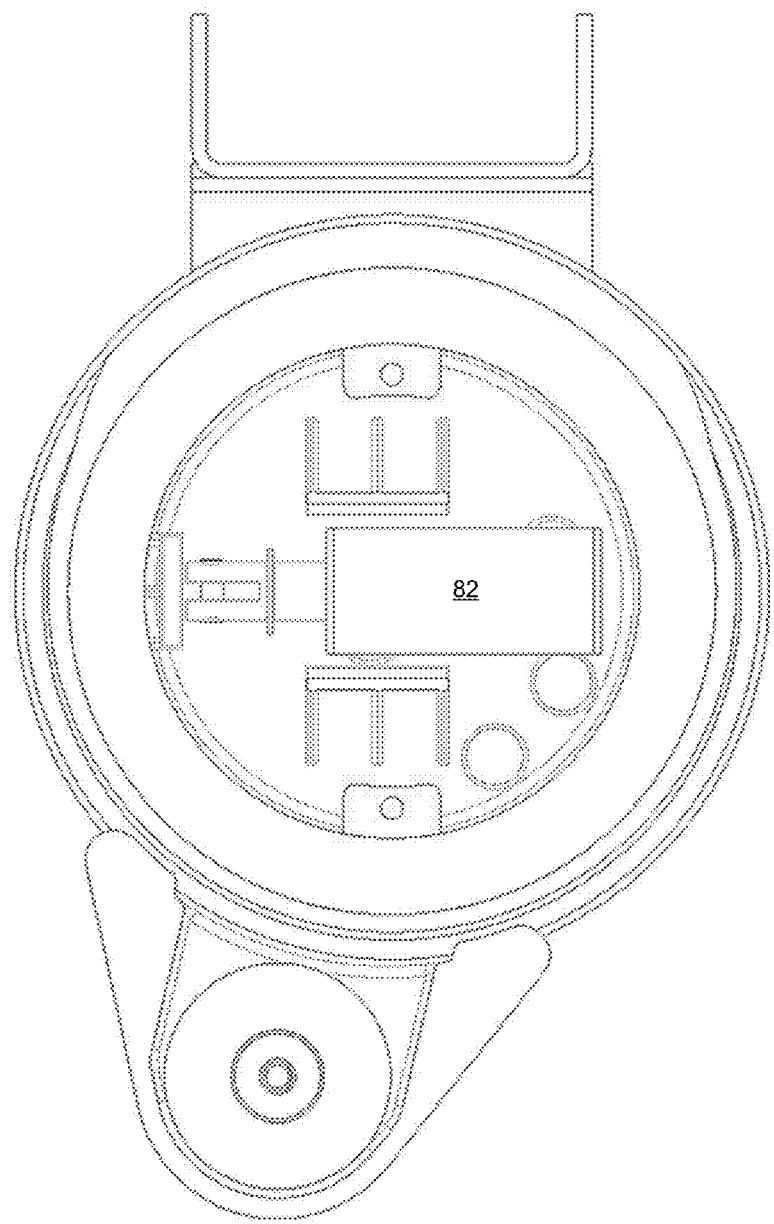
FIG. 21 is a side view of an actuator for use with the locking mechanism of FIG. 17 where the actuator is positioned to disengage the locking mechanism.
Figure 22:
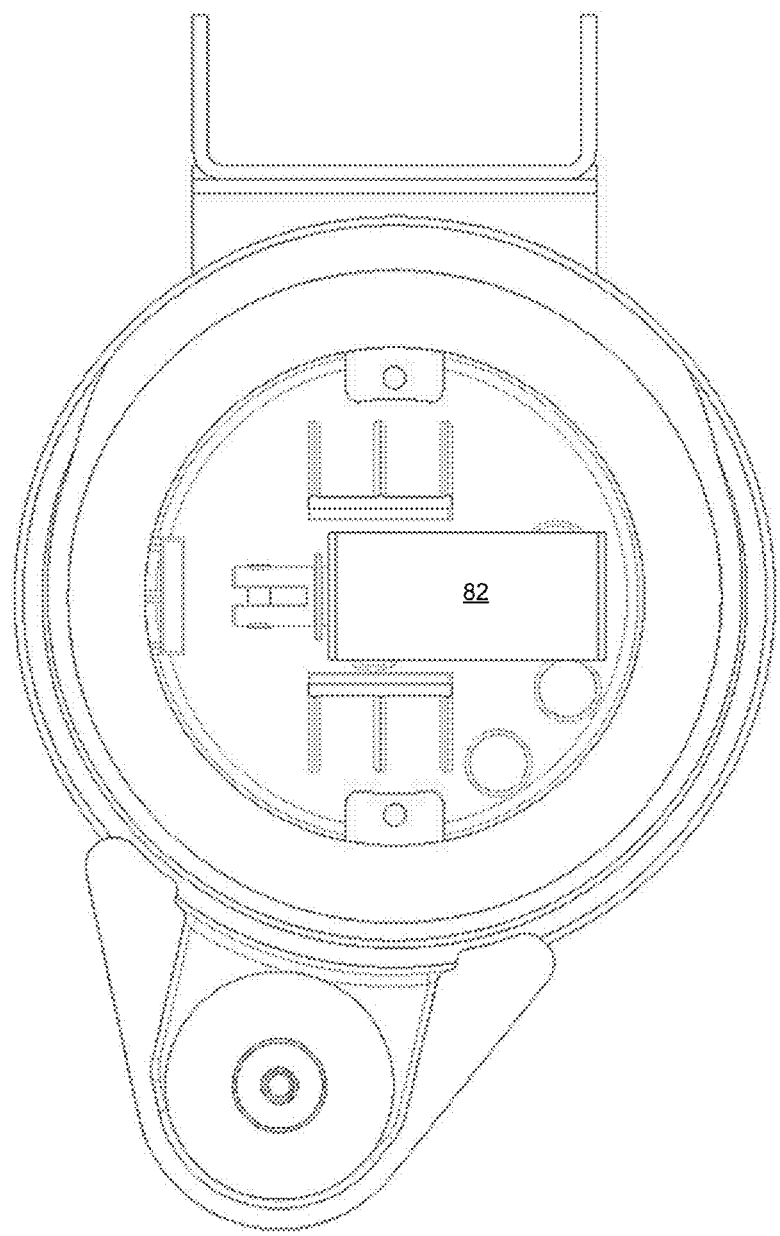
FIG. 22 is a side view of the actuator of FIG. 21 where the actuator is positioned to engage the locking mechanism.

FIG. 17 is a perspective view showing the locking mechanism 62 in an engaged (i.e., locked) position and FIG. 18 is a perspective view showing the locking mechanism 62 in a disengaged (i.e., unlocked) position. FIG. 19 is an end view showing the locking mechanism 62 in an engaged (i.e., locked) position and FIG. 20 is an end view showing the locking mechanism 62 in a disengaged (i.e., unlocked) position. FIG. 21 is an end view showing the position of the actuator 82 when the locking mechanism 62 is in an engaged (i.e., locked) position and FIG. 20 is an end view showing the position of the actuator 82 when the locking mechanism 62 is in a disengaged (i.e., unlocked) position.

Figure 23A:
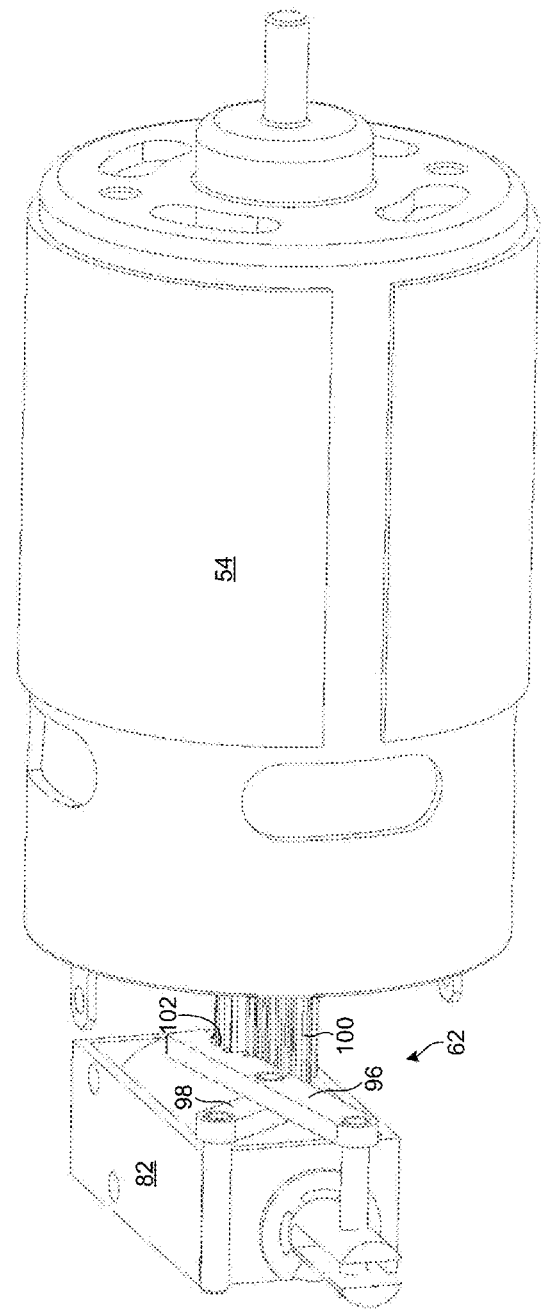
FIG. 23A is an internal view of another embodiment of a locking mechanism in accordance with the invention, with the locking mechanism engaged.
Figure 23B:
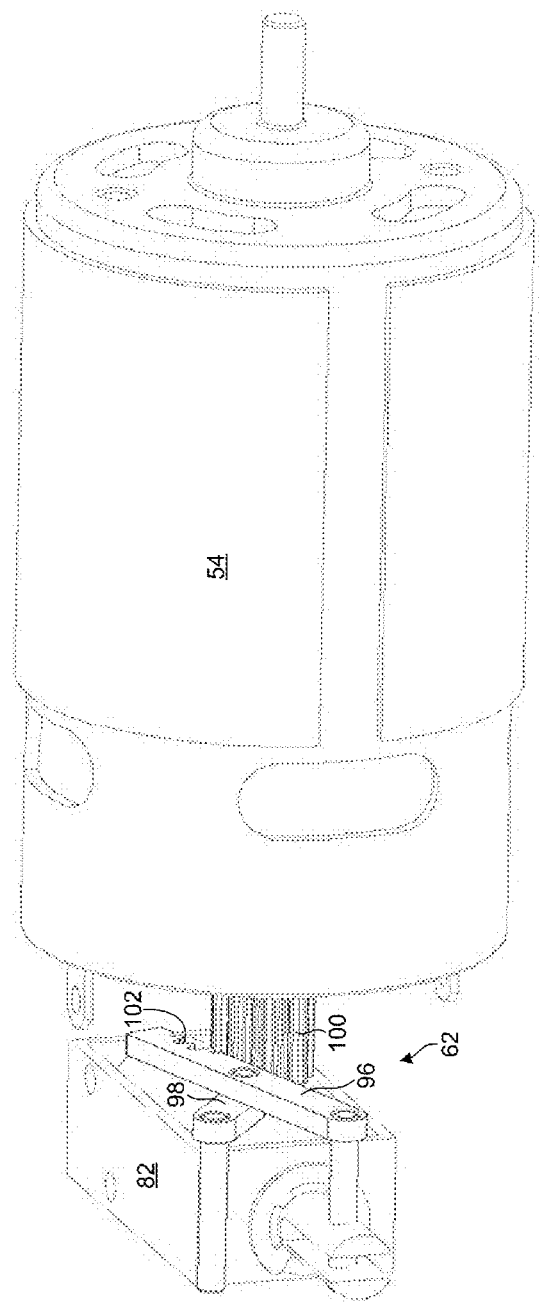
FIG. 23B is an internal view of the locking mechanism of FIG. 23A with the locking mechanism disengaged.
Figure 24A:
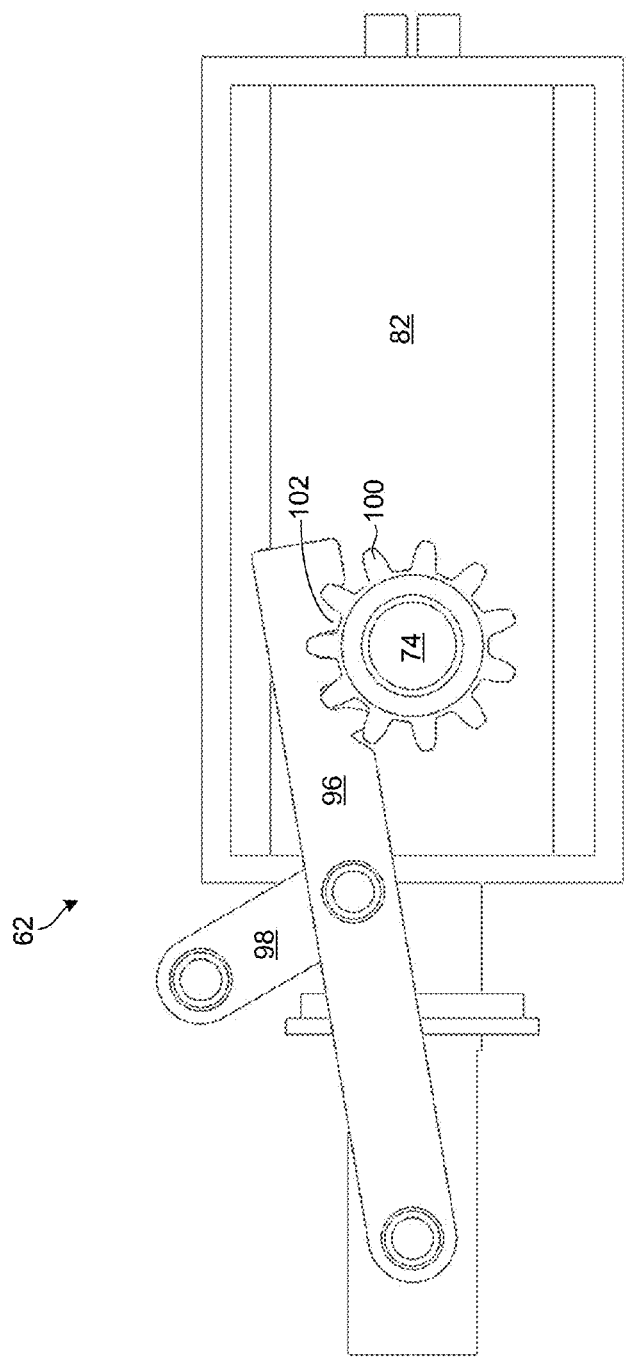
FIG. 24A is a side view of the locking mechanism of FIG. 23A with the locking mechanism engaged.
Figure 24B:
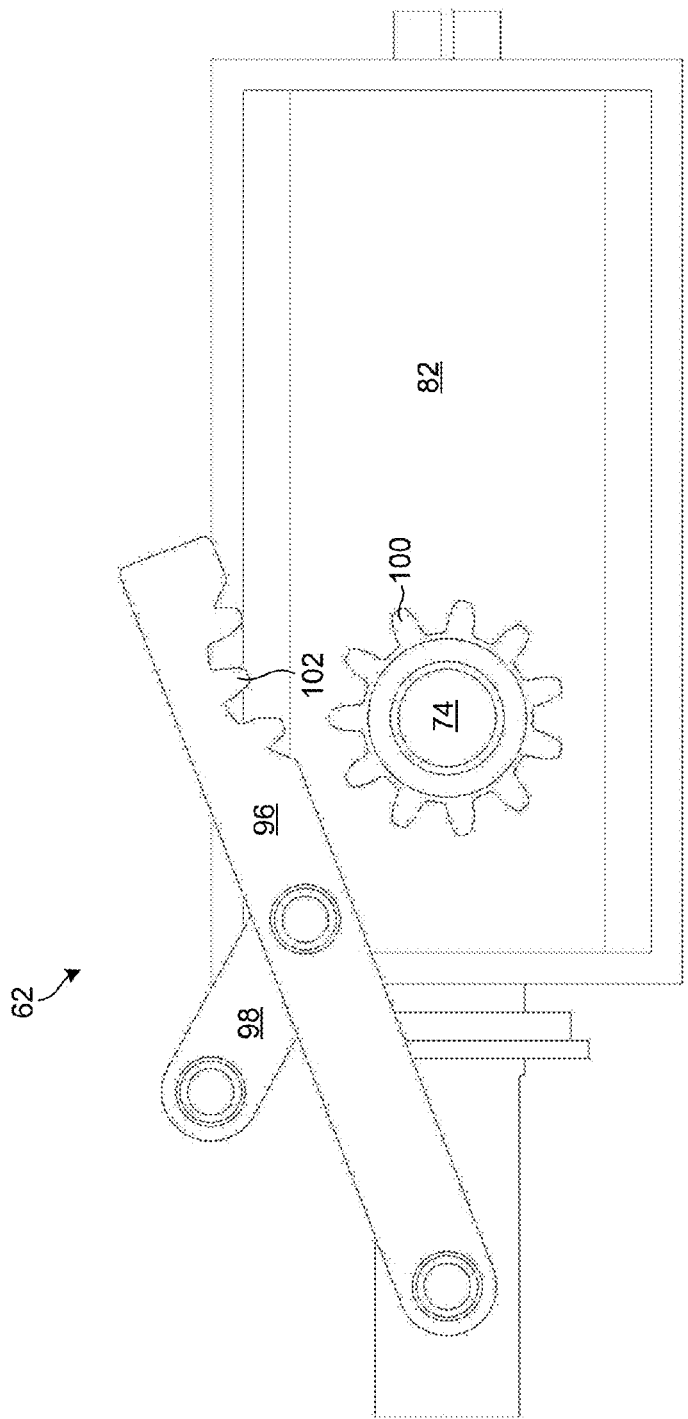
FIG. 24B is a side view of the locking mechanism of FIG. 23B with the locking mechanism disengaged.

Referring to FIGS. 23A through 24B, another embodiment of a locking mechanism 62 in accordance with the invention is illustrated. Like the previous embodiment, the locking mechanism 62 is positioned on the non-driving end of the motor 54, although it may also potentially be positioned on the driving end of the motor. In this embodiment, the locking mechanism 62 includes an arm 96 comprising a locking feature 102, such as gear teeth. This locking feature 102 may engage a corresponding locking feature 100 on the shaft 74, or a component connected to the shaft 74, such as gear teeth. An actuator 82 (e.g., solenoid) may move the arm 96 to selectively engage and disengage the locking features 100, 102. In the illustrated embodiment, the actuator 82 combined with a pivoting linkage member 98 moves the arm toward the shaft 74 or away from the shaft 74, depending on the position of the actuator 82. FIG. 23A is a perspective view showing the locking mechanism 62 with the shaft 74 locked and FIG. 23B is a perspective view showing the locking mechanism 62 with the shaft 74 unlocked. FIG. 24A is an end view showing the locking mechanism 62 with the shaft 74 locked and FIG. 24B is an end view showing the locking mechanism 62 with the shaft 74 unlocked.

Figure 25:
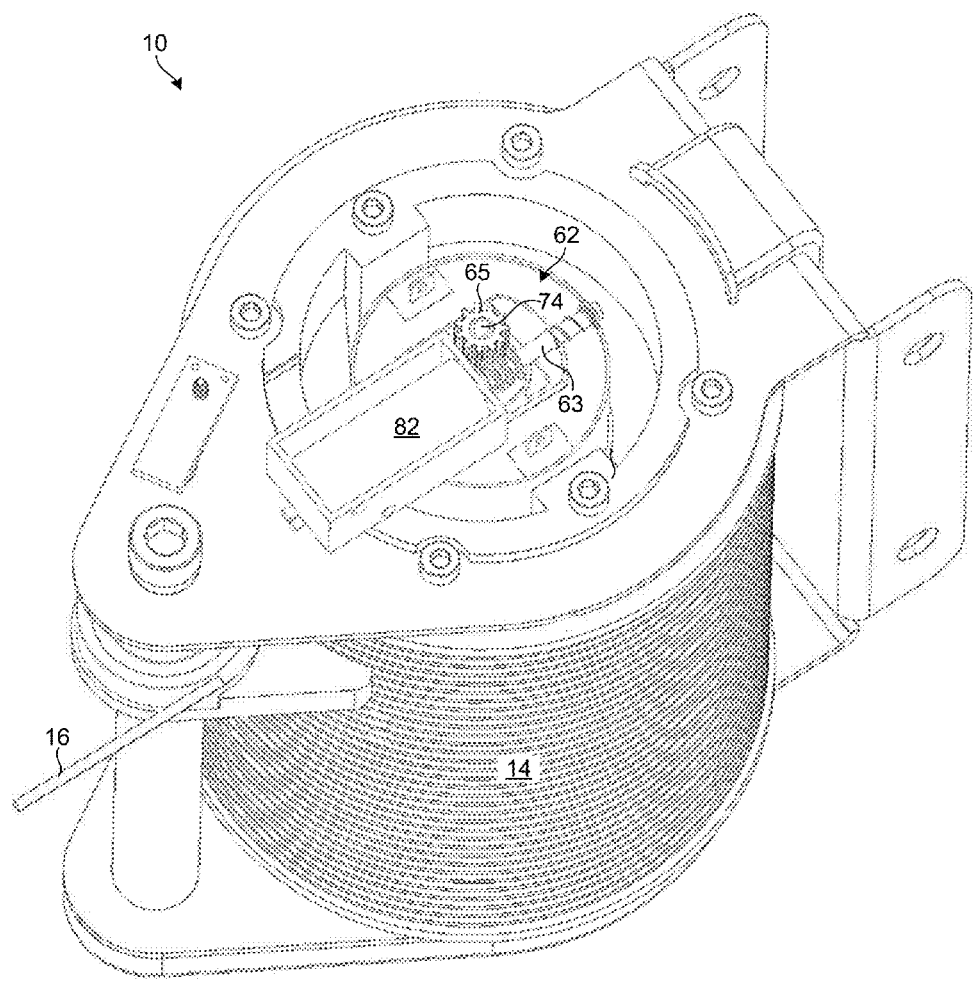
FIG. 25 is a perspective view of another embodiment of a locking mechanism in accordance with the invention, in this example a rack-and-pinion-type locking mechanism.

Referring to FIG. 25, another embodiment of a locking mechanism 62 in accordance with the invention is illustrated. In this embodiment, the locking mechanism 62 uses a rack 63 and pinion 65 to lock the shaft 74. Like the previous embodiment, the locking mechanism 62 is positioned on the non-driving end of the motor 54, although it may also potentially be positioned on the driving end of the motor 54. As shown, the locking mechanism 62 includes an actuator 82 to move a rack 63 in a direction substantially perpendicular to the shaft 74. A pinion 65 is rigidly attached to the shaft 74 and rotates with the shaft 74.

Figure 26A:
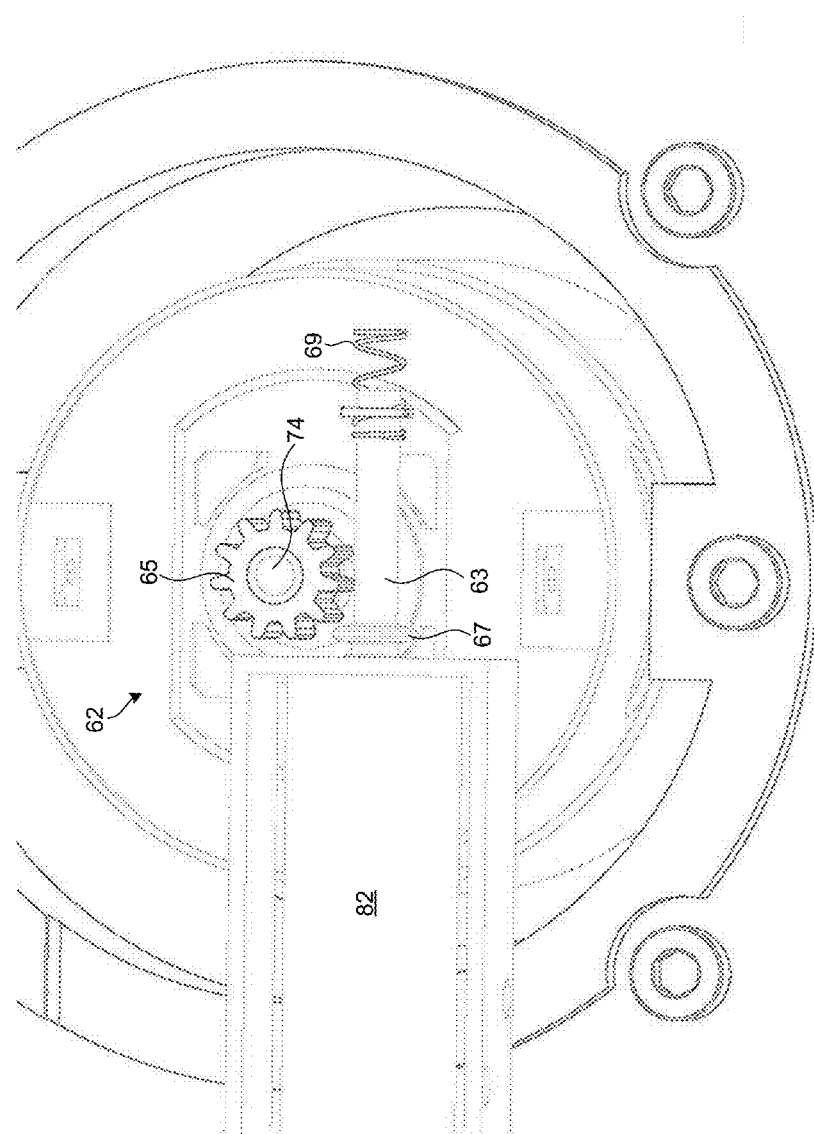
FIG. 26A is a close-up view of the locking mechanism of FIG. 25, with the locking mechanism disengaged.
Figure 26B:
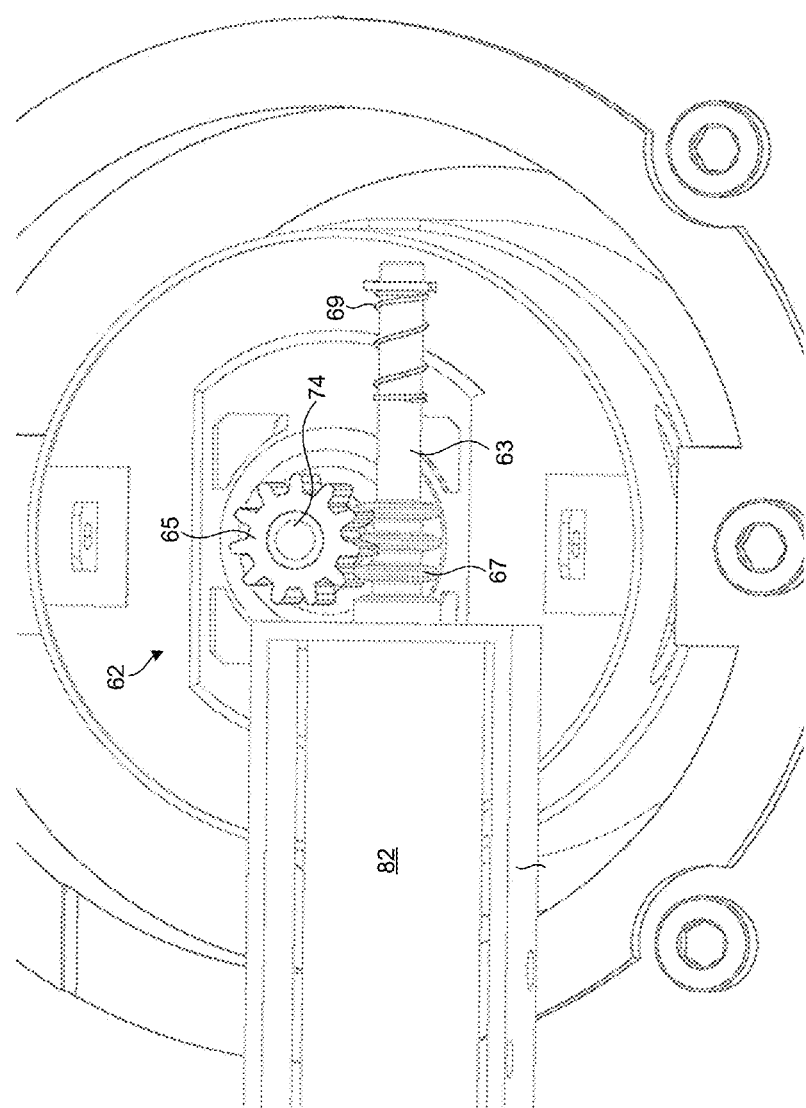
FIG. 26B is a close-up view of the locking mechanism of FIG. 25, with the locking mechanism engaged.

To disengage the locking mechanism 62, the actuator 82 withdraws the rack 63 from the pinion 65 such that the teeth of the pinion 65 do not engage the teeth 67 of the rack 63. This allows the shaft 74 to spin freely. To engage the locking mechanism 62, the actuator 82 releases the rack 63 and a spring 69 urges the rack 63 toward the pinion 65. This causes the teeth 67 of the rack 63 to engage and catch the teeth of the pinion 65. Rotation of the pinion 65 will pull the rack 63 into full engagement with the pinion 65. When the actuator 82 is fully extended, the rack 63 will be unable move, thereby preventing rotation of the pinion 65 and shaft 74. In certain embodiments, the rack 63 may be brought to a gradual stop with an elastic member (not shown) such as a spring, rubber stop, or shock absorber located at or near an end of the rack 63 or incorporated into the actuator 82. This will soften any impact that occurs when the locking mechanism 62 engages. FIG. 26A shows a close-up view of the rack-and-pinion locking mechanism 62 when disengaged and FIG. 26B shows a close-up view of the rack-and-pinion locking mechanism 62 when engaged.

In certain embodiments, an additional braking mechanism may be provided to assist the locking mechanisms 62 illustrated in FIG. 14 through 26B. In certain cases, a locking mechanism 62 may have trouble engaging or may be subject to excessive wear and tear if the motor 54 is spinning too fast when the locking mechanism 62 tries to engage. The additional braking mechanism may slow the motor 54 sufficiently for the locking mechanism 62 to engage as well as prevent wear and tear on the locking mechanism 62.

Figure 38:
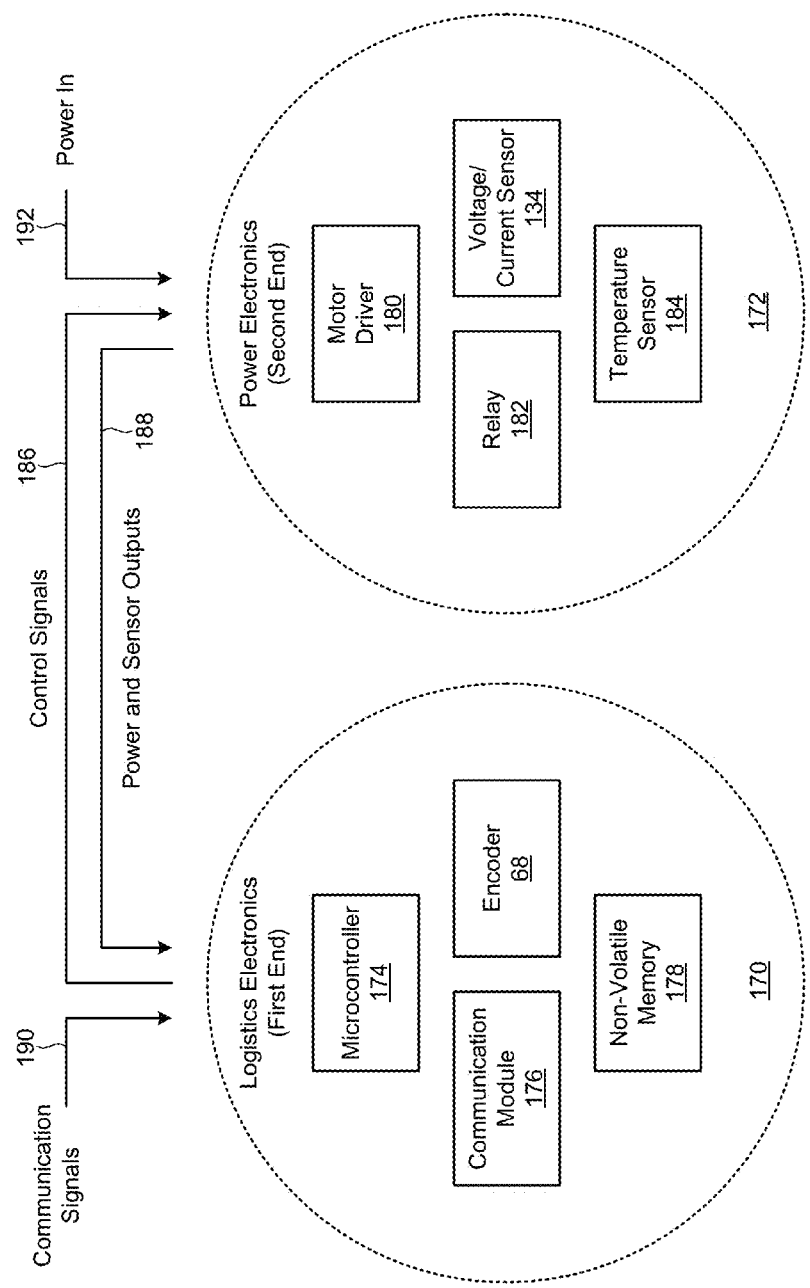
FIG. 38 is a high-level view of various hardware components that may be used in a motorized lifting device in accordance with the invention.

In one embodiment, the additional braking mechanism is provided by automatically shorting the motor leads when the motor is stopped or power is interrupted. With a DC motor 54, shorting the motor leads may cause the motor 54 to act as a generator, thereby causing the motor 54 to resist rotation. The motor 54 will ideally slow down enough for the locking mechanism 62 to engage. In certain embodiments, the motor leads are shorted with a relay 182 that automatically closes when the motor 54 stops or power is interrupted, as shown in FIG. 38.

In other embodiments, an energy storage device such as a battery or capacitor may be used as a braking mechanism. When power to the motorized lifting device 10 is interrupted, the energy storage device may power the motor 54 in a direction opposite the direction of rotation, thereby slowing the motor 54 sufficiently to engage the locking mechanism 62. An energy storage device having suitable storage capacity and power density may be selected to provide the desired braking function long enough for the locking mechanism 62 to engage. In certain embodiments, the energy storage device may also provide temporary power to other electronics to enable an orderly shut down of the motorized lifting device 10. For example, electronics (such as the logistics electronics previously discussed) may be powered for long enough to store a current position of the end of the line 16 or other information that may be helpful or required when power is restored.

Figure 27:
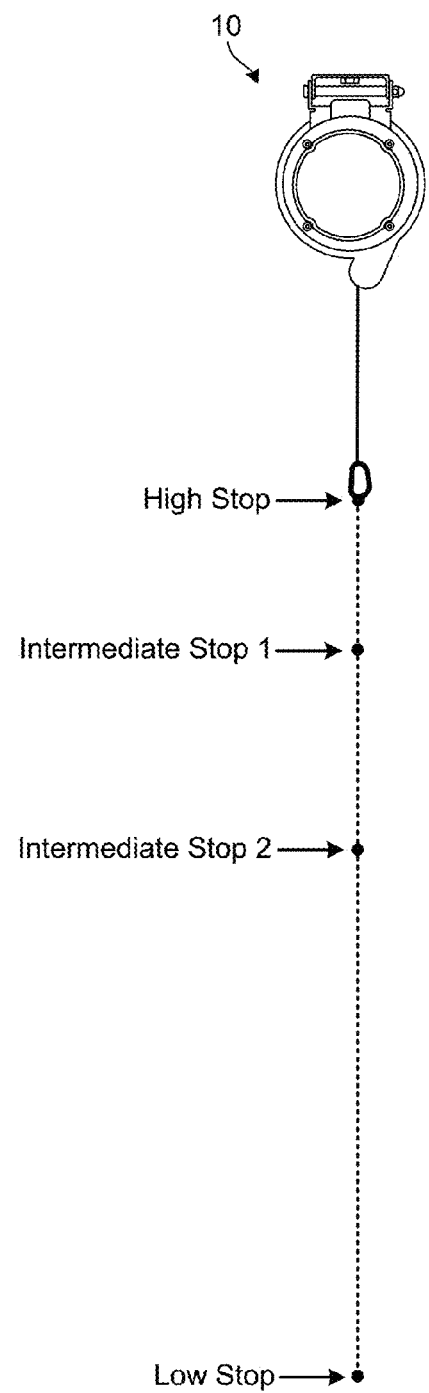
FIG. 27 is a diagram showing one or more set points for a motorized lifting device in accordance with the invention.

Referring to FIG. 27, as previously mentioned, the motorized lifting device 10 may be configured to lift or lower a load, up to the weight rating of the device. Various controls may be provided with the motorized lifting device 10 to enable a user to lift or lower the load. For example, the controls may provide a "lift" and "lower" button that when pressed causes an end of the line 16 to go up and down respectively. Such controls may provide fairly rudimentary operation of the motorized lifting device 10.

In certain cases, it may be desirable for the motorized lifting device 10 to function in a more intelligent manner. For example, it may be desirable to establish various set points for the motorized lifting device 10 and have the motorized lifting device 10 automatically stop at these set points as it lifts or lowers a load. For example, referring to FIG. 27, a user may establish the following set points: High Stop, Intermediate Stop 1, Intermediate Stop 2, and Low Stop. In certain embodiments, the user may establish the set points by raising or lowering the line 16 and selecting an option to store or remember the position of the line 16 at each stop. Once the set points are established, a user may press a "smart lift" or "smart lower" button to cause the motorized lifting device 10 to raise or lower the line 16 to the next set point, without requiring the user to hold down the button or be present. Such a feature may be useful to intelligently lift or lower a wide variety of loads with just a touch of a button.

Figure 28:
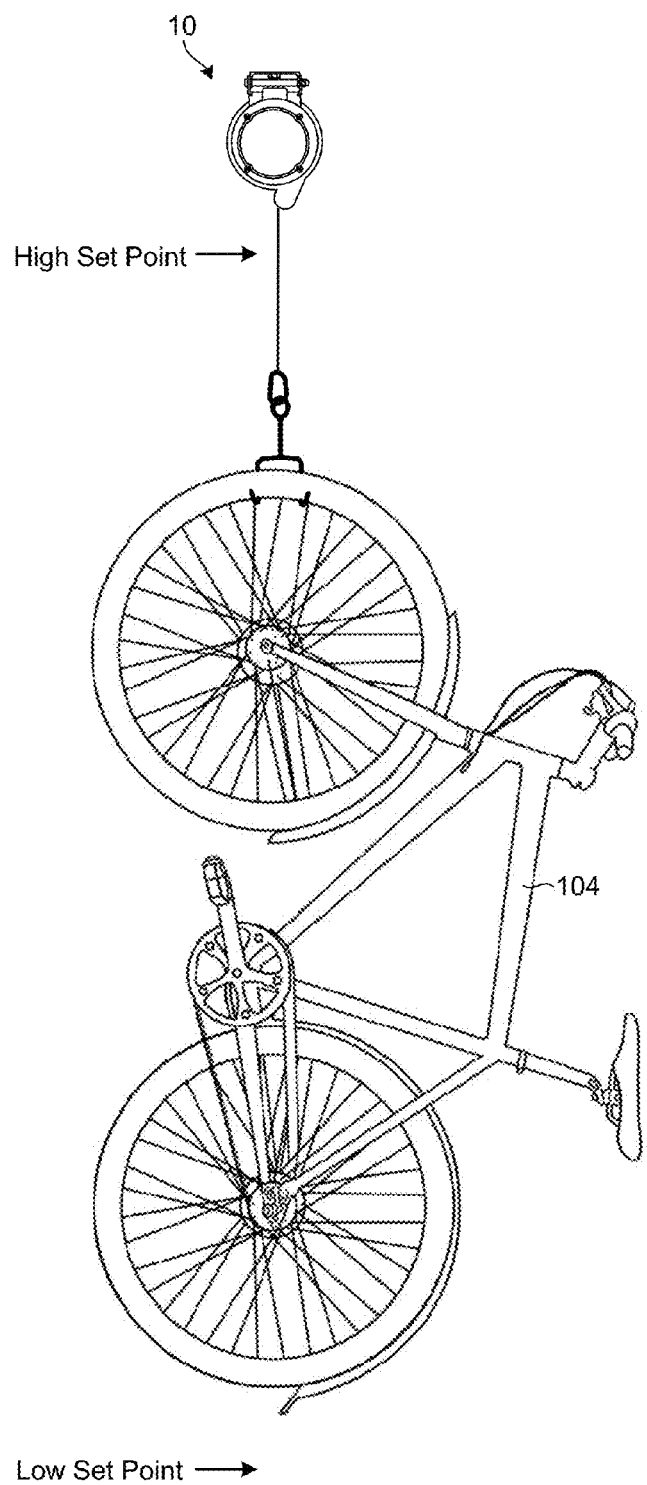
FIG. 28 is a diagram showing how set points may be used to lift and lower an object, in this example a bicycle.

For example, referring to FIG. 28, if the motorized lifting device 10 is mounted to a ceiling and used to lift or lower a bicycle from the ceiling, a user may desire to establish the set points illustrated in FIG. 28. A first set point (i.e., High Set Point) may raise the bicycle 104 close to the ceiling and a second set point (i.e., Low Set Point) may lower the bicycle 104 to a point at or near a floor where the bicycle may be easily released from the line 16, as well as allow the bicycle 104 to be re-attached to the line 16 when it is ready to be raised back up. The user may establish the set points by raising or lowering the bicycle to desired points and selecting the option to store or remember the position of bicycle. Once the set points are established, a user may press a "smart lift" or "smart lower" button to raise or lower the bicycle to the established set points without requiring the user to hold down the buttons.

Figure 29:
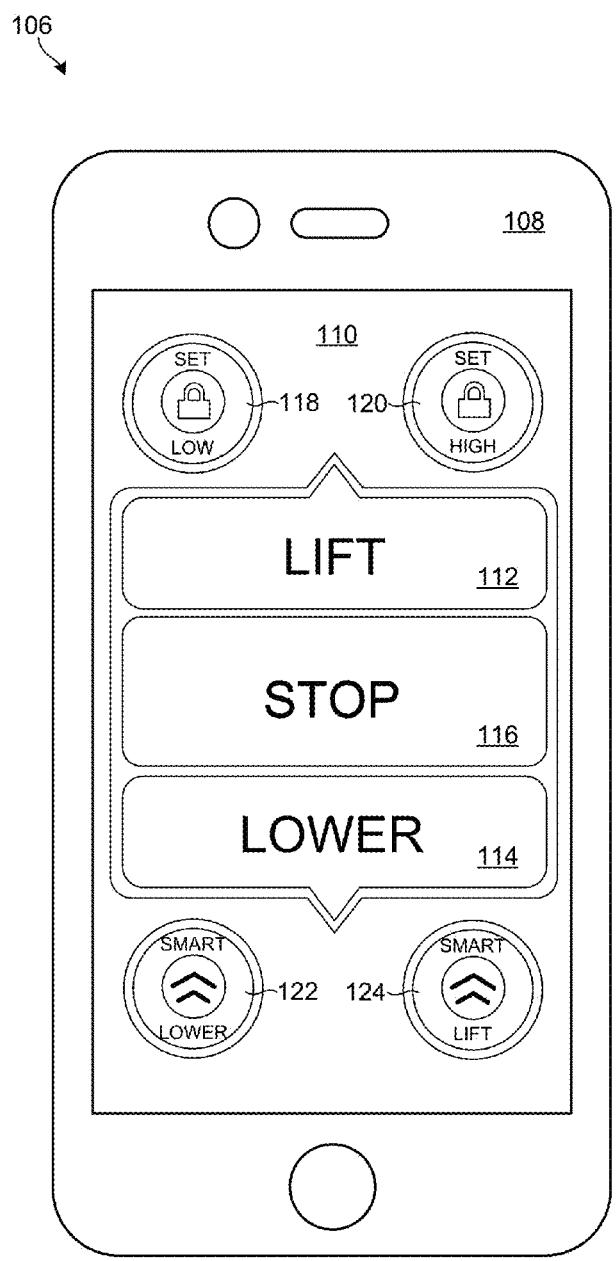
FIG. 29 is a high-level view of one embodiment of a user interface for controlling a motorized lifting device in accordance with the invention, the user interface implemented on a mobile general-purpose processing device such as a smart phone.

Referring to FIG. 29, one embodiment of a controller 106 for performing the functions described in association with FIGS. 27 and 28 is illustrated. In this example, such a controller 106 is embodied as an application executing on a mobile general-purpose processing device 108, such as a smart phone, tablet, or laptop. As shown in FIG. 29, in certain embodiments, the application may include a user interface 110 providing various controls. Such a user interface 110 may take on many forms and thus is presented by way of example and not limitation. It should be recognized that the user interface 110 may include other pages, windows, menus, or the like, and thus is not intended to reflect the complete functionality of the application. Other possible features or functions of the application are described in more detail in association with FIG. 40. It should also be recognized that although certain features and functions are shown on the user interface 110, such functions and features could easily be distributed across multiple pages, windows, or menus of a user interface 110.

As shown in FIG. 29, in certain embodiments, the user interface 110 may include one or more of the following virtual buttons for operation by a user: a "lift" button 112, a "lower" button 114, and a "stop" button 116. Pressing the "lift" button 112 may cause the motorized lifting device 10 to raise the line 16 until the button is released or until the line 16 reaches an upper limit or stop point. Similarly, pressing the "lower" button 114 may cause the motorized lifting device 10 to lower the line 16 until the button is released or the line 16 reaches a lower limit or stop point. Pressing the "stop" button 116 may cause the motorized lifting device 10 to stop. In certain embodiments, stopping the motorized lifting device 10 may include engaging the locking mechanism 62 previously discussed. Similarly, either raising or lowering the line 16 may cause the locking mechanism 62 to disengage.

The user interface 110 may also include buttons that enable the motorized lifting device 10 to function in a more intelligent manner. For example, the user interface 110 may enable a user to establish various set points for the motorized lifting device 10 and have the motorized lifting device 10 automatically stop at these set points as it lifts or lowers a load. For example, a "set low" button 118 may establish a low set point at a current location of the line 16. Similarly, a "set high" button 120 may establish a high set point at a current location of the line 16. The high set point and low set point may be stored in non-volatile memory (such as memory of the processing device 108 or in memory of the motorized lifting device 10) for use at a later time.

A "smart lower" button 122 may cause the motorized lifting device 10 to lower the line 16 until it reaches the low set point and a "smart lift" button 124 may cause the motorized lifting device 10 to raise the line 16 until it reaches the high set point. In other embodiments, the user interface 110 may enable a user to establish other intermediate set points in addition to the high and low set points. Unlike the "lift" button 112 and the "lower" button 114, a user may not be required to hold down the "smart lower" button 122 or "smart lift" button 124 to perform the associated functions.

Figure 30:
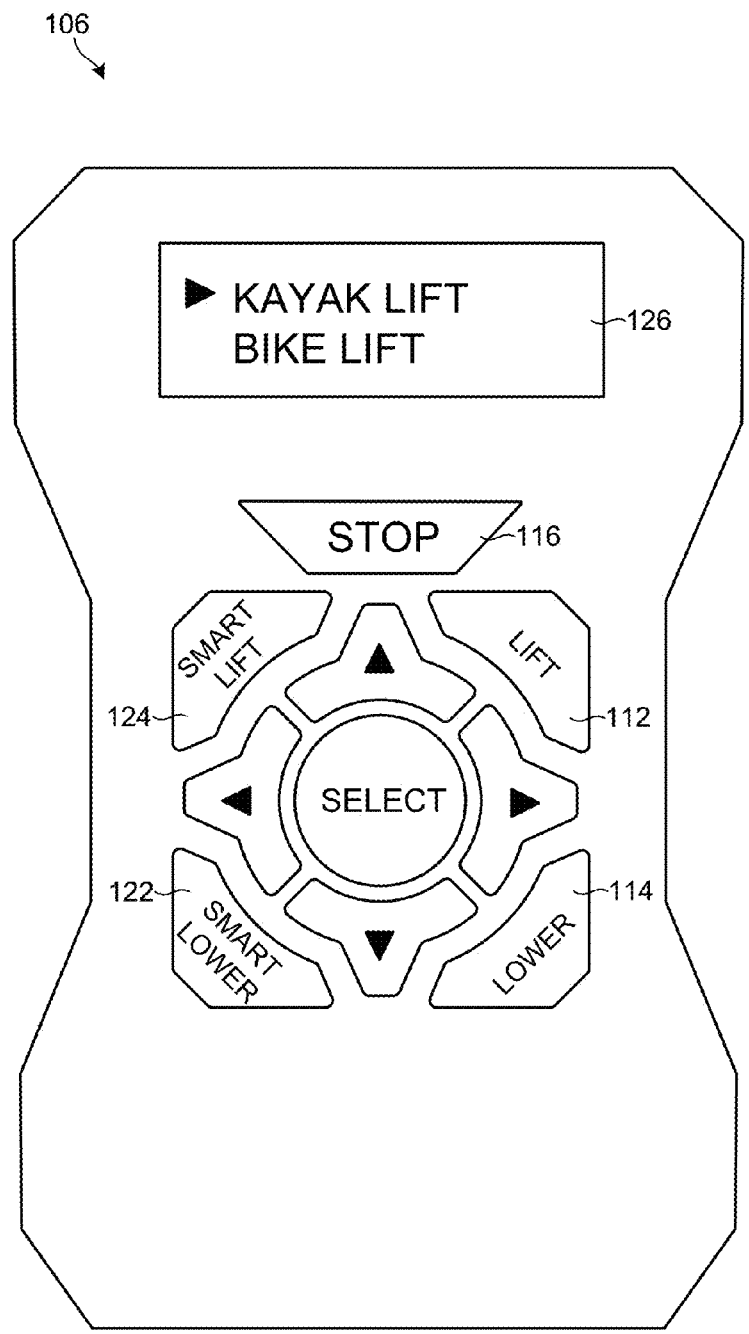
FIG. 30 is a high-level view of one embodiment of a user interface for controlling a motorized lifting device in accordance with the invention, the user interface implemented on a dedicated remote control.

Referring to FIG. 30, in other embodiments, a controller 106 in accordance with the invention may take the form of a dedicated controller 106. Such a dedicated controller 106 may contain hardware and firmware dedicated to controlling the motorized lifting device 10. In this embodiment, the controller 106 includes a display 126 and various physical buttons. In certain embodiments, physical buttons such as a "lift" button 112, "lower" button 114, "stop" button 116, "smart lower" button 122, and "smart lift" button 124 may be provided. Other physical buttons such as arrow buttons and a "select" button may enable a user to navigate the display 126 and select particular options or items. Any of the physical buttons may be implemented as virtual buttons, such as buttons on a touch screen. As shown on the display 126 of FIG. 30, particular motorized lifting devices 10 may be assigned names, such as "kayak" or "bike", depending on the type of load that is being lifted. These names may be combined with possible actions to enable the user to quickly select the action he or she wants to perform. For example, in the illustrated embodiment, the display 126 provides a "kayak lift" and "bike lift" option. Selecting these options may cause the motorized lifting device 10 to lift the object to a high set point established for these objects. The dedicated controller 106 is presented by way of example and not limitation. Other features and functions for the dedicated controller 106 are possible and within the scope of the invention.

Figure 31:
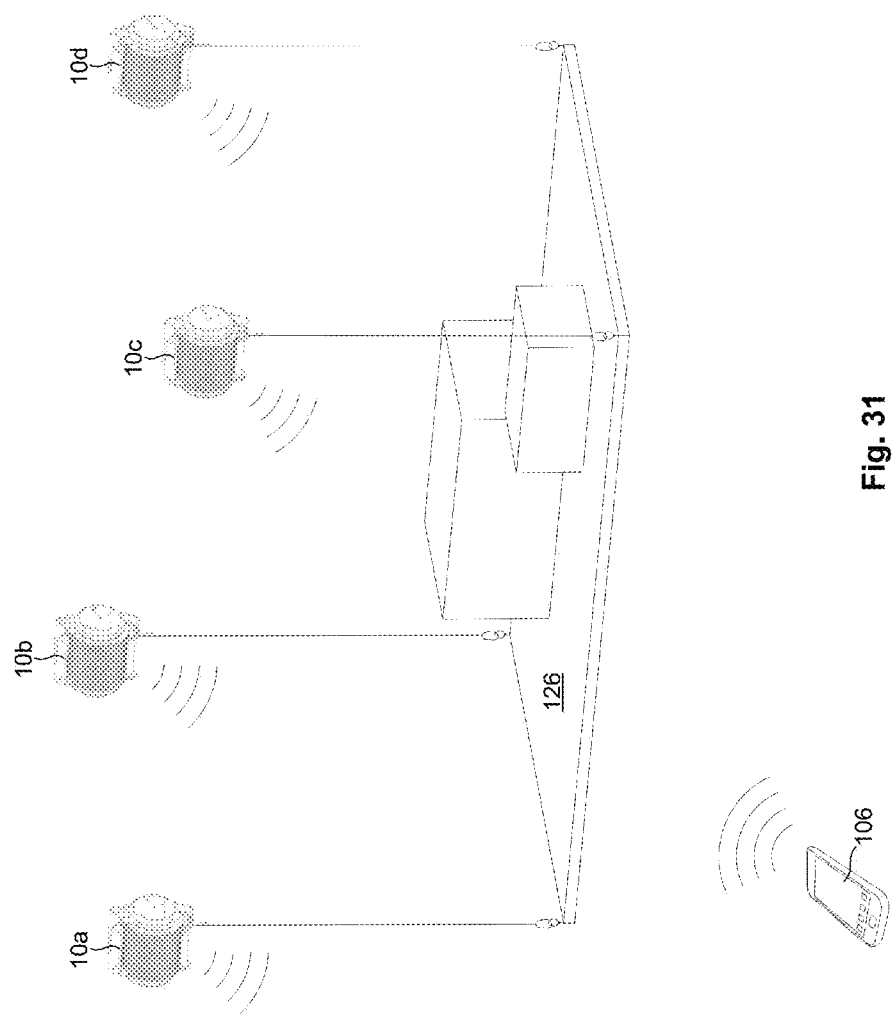
FIG. 31 is a high-level view of a group of motorized lifting devices configured for synchronized operation.

Referring to FIG. 31, in certain embodiments, it may be desirable to have multiple motorized lifting devices 10 operate in a synchronized manner. For example, multiple motorized lifting devices 10*a-d* may be configured to lift a shared load, such as the illustrated platform 126. When using multiple synchronizing motorized lifting devices 10 to lift a shared load, apparatus and methods are needed to ensure that the motorized lifting devices 10 stay synchronized. For example, if one motorized lifting device 10 were to stop while the other motorized lifting devices 10 continued lifting or lowering a load, the platform 126 could tip, potentially spilling items or creating a safety hazard. A similar situation could occur if some motorized lifting devices 10 were to move faster or slower than others. For example, if a load were distributed unevenly among the motorized lifting devices 10, this could cause some motorized lifting devices 10 to move faster or slower than others, potentially causing the platform 126 to tip. Apparatus and methods are needed to detect such conditions and make speed or position adjustments where needed to ensure that the motorized lifting devices 10 stay synchronized with one another.

As will be explained in more detail hereafter, in certain embodiments a grouping module may be used to group motorized lifting devices 10 for synchronized operation and a synchronization module may be used to keep the group of motorized lifting devices 10 synchronized with one another. Once grouped, the motorized lifting devices 10 may be operated as if they were a single device. For example, a single button press on the controller 106 may cause all of the motorized lifting devices 10 in the group to operate in a synchronized manner, such as by lifting or lowering a load.

In certain embodiments, the grouping module and synchronization module may be implemented in the controller 106 previously discussed. In other embodiments, the grouping module or synchronization module may be implemented in the motorized lifting devices 10 or distributed between the controller 106 and the motorized lifting devices 10. In general, the synchronization module may monitor operating parameters (position of the line, speed, etc) of the motorized lifting devices 10 in the group and adjust the operating parameters to keep the motorized lifting devices 10 substantially synchronized.

In certain embodiments, a synchronization module in accordance with the invention may be configured to identify a slowest moving motorized lifting device 10 in a group and then adjust the other motorized lifting devices 10 in the group to keep pace with the slowest motorized lifting device 10. For example, if a group of motorized lifting devices 10 is lifting a shared load and the synchronization module detects (by requesting or periodically receiving data, etc.) that one of the motorized lifting devices 10 in the group is lifting or lowering the load slower than the others (due, for example, to supporting more weight than the other motorized lifting devices 10), the synchronization module may adjust (by sending commands, etc.) the speed of the other motorized lifting devices 10 to match the speed of the slowest motorized lifting device 10. Similarly, if the synchronization module detects that an amount of line 16 let out from each of the motorized lifting devices 10 is causing a tilted platform 126, the synchronization module may adjust the amount of line 16 let out from each of the motorized lifting devices 10 to level out the platform 126. Similarly, if the synchronization module detects that one of the motorized lifting devices 10 has stopped (due, for example, to a power outage or an overload condition) or loss of communication, the synchronization module may cause the other motorized lifting devices 10 to stop to maintain a level platform 126 or prevent safety hazards. In certain embodiments, a loss of communication between a controller and any motorized lifting device 10 may automatically cause the motorized lifting device 10 to stop, since operating parameters of the motorized lifting device 10 may no longer be monitored.

Figure 32:
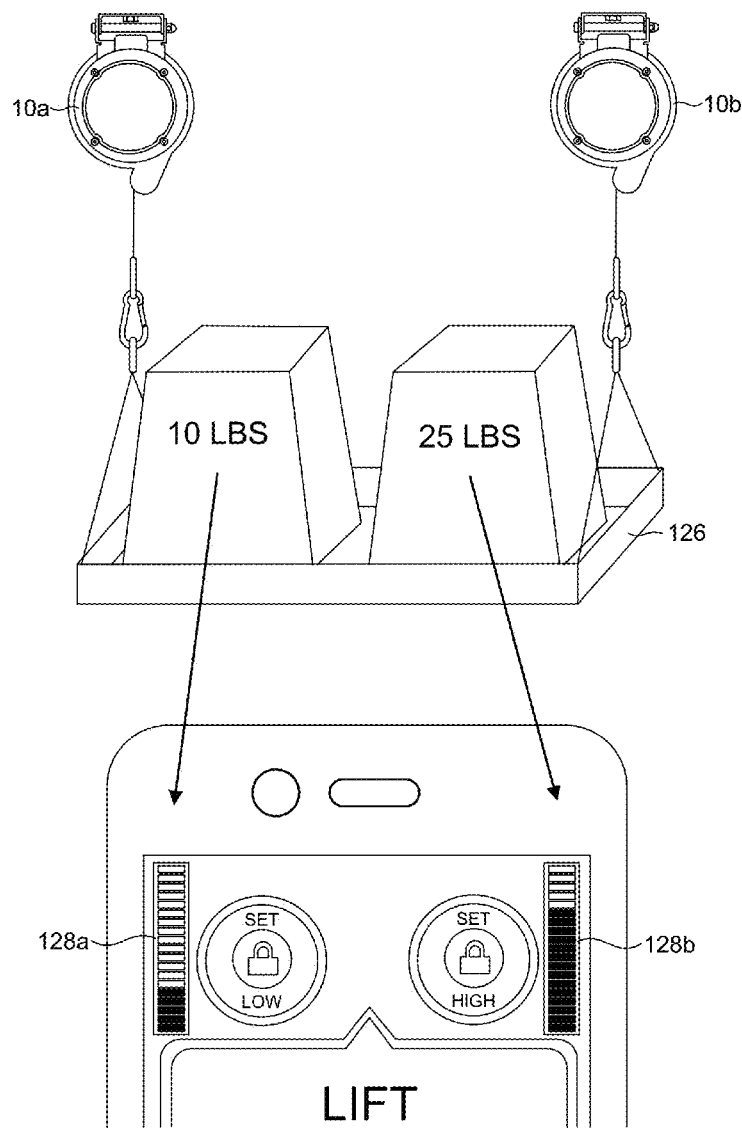
FIG. 32 is a high-level view of a user interface for managing a load distributed between multiple motorized lifting devices.

Referring to FIG. 32, in certain embodiments, when several motorized lifting devices 10 are grouped for synchronized operation, it may be desirable to more optimally distribute a load between the motorized lifting devices 10. As mentioned above, a poorly distributed load may cause one or more of the motorized lifting devices 10 to be overloaded (causing a shutdown) or cause certain motorized lifting devices 10 to operate slower than others. FIG. 32 shows an example where a shared load is unequally distributed between a pair of motorized lifting devices 10*a*, 10*b*. Specifically, a ten pound weight is located near the motorized lifting device 10*a* and a twenty-five pound weight is located near the motorized lifting device 10*b*.

In certain embodiments, the application discussed in association with FIG. 29 may be configured to assist a user in more optimally placing the load. For example, in one embodiment, the user interface 110 may include a gauge 128 for each motorized lifting device 10 in the group, where each gauge 128 indicates an amount of weight supported by the motorized lifting device 10. In certain embodiments, the gauge 128 may use colors to indicate an amount of weight (e.g., color going from green to red as the amount of weight increases). Using this information, the user may rearrange weights on the platform 126 to more equally distribute the weight among the motorized lifting devices 10*a*, 10*b*. In other or the same embodiments, the application may be configured to suggest how to redistribute weight among the motorized lifting devices 10. For example, based on the measured weight values, the application may suggest to "move weight toward motorized lifting device X" or "reduce weight on motorized lifting device X" to more equally distribute the weight.

Figure 33:
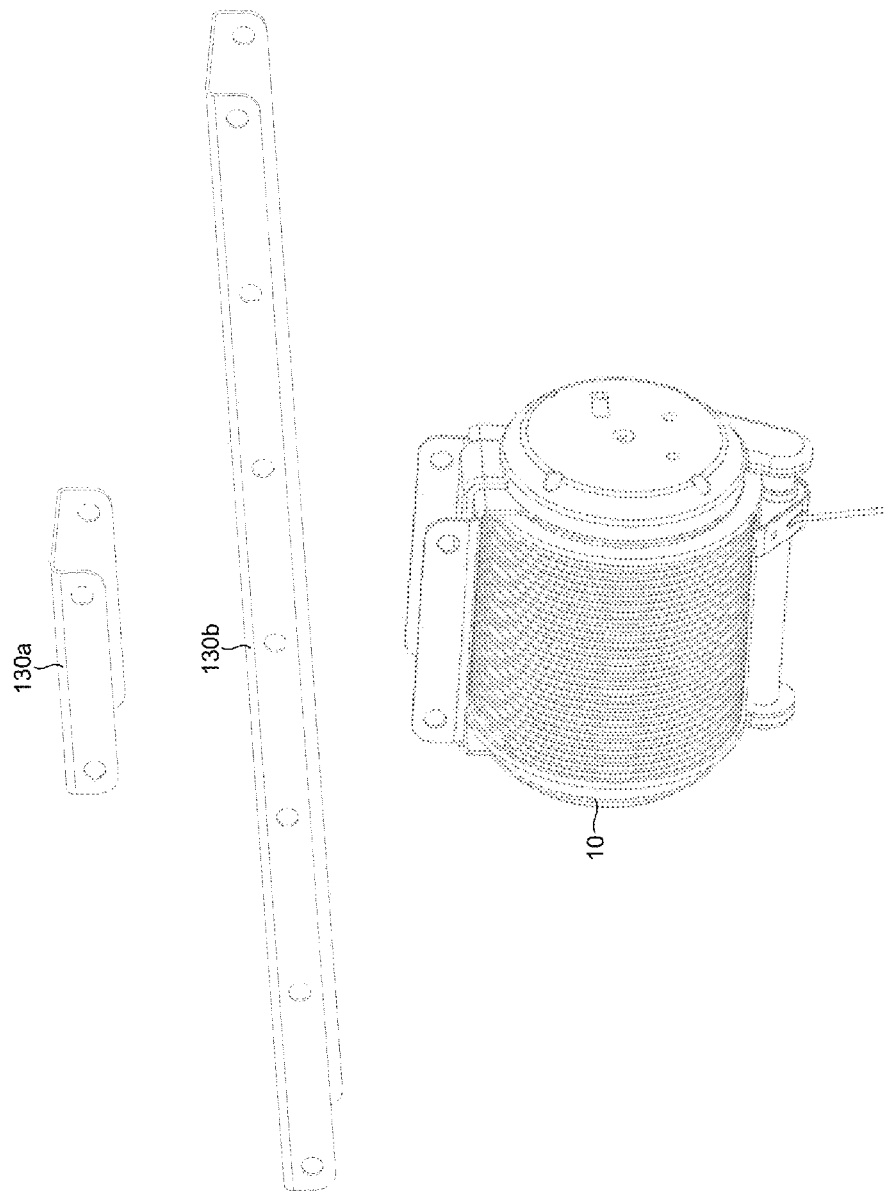
FIG. 33 is a perspective view of one embodiment of a quick mounting system for a motorized lifting device in accordance with the invention.

Referring to FIG. 33, in certain embodiments, a mounting bracket 130 may be provided to enable quick and easy mounting/dismounting of the motorized lifting device 10 to a wall, ceiling, or other structure. FIG. 33 shows a short mounting bracket 130*a* that may be mounted to a wall, ceiling, or other structure. The motorized lifting device 10 may be quickly attached to the mounting bracket 130*a* with pins, bolts, or other fasteners. FIG. 9 shows a motorized lifting device 10 mounted to a bracket like that illustrated in FIG. 33 with removable pins. FIG. 33 shows a longer mounting bracket 130*b* that may be mounted to a wall, ceiling, or structure. The longer bracket 130*b* is advantageous in that a motorized lifting device 10 may be moved to a desired position along the bracket 130*b*, or multiple motorized lifting devices 10 may be simultaneously mounted to the bracket 130*b* at different locations. The longer bracket 130*b* may also be advantageous in that the bracket 130*b* may be mounted to a stud, joist, or structural member, or across several studs, joists, or structural members, allowing the motorized lifting device 10 to be mounted to the bracket 130*b* at points in between. Thus, the longer bracket 130*b* may provide greater flexibility as to where to mount the motorized lifting device 10.

Figure 34:
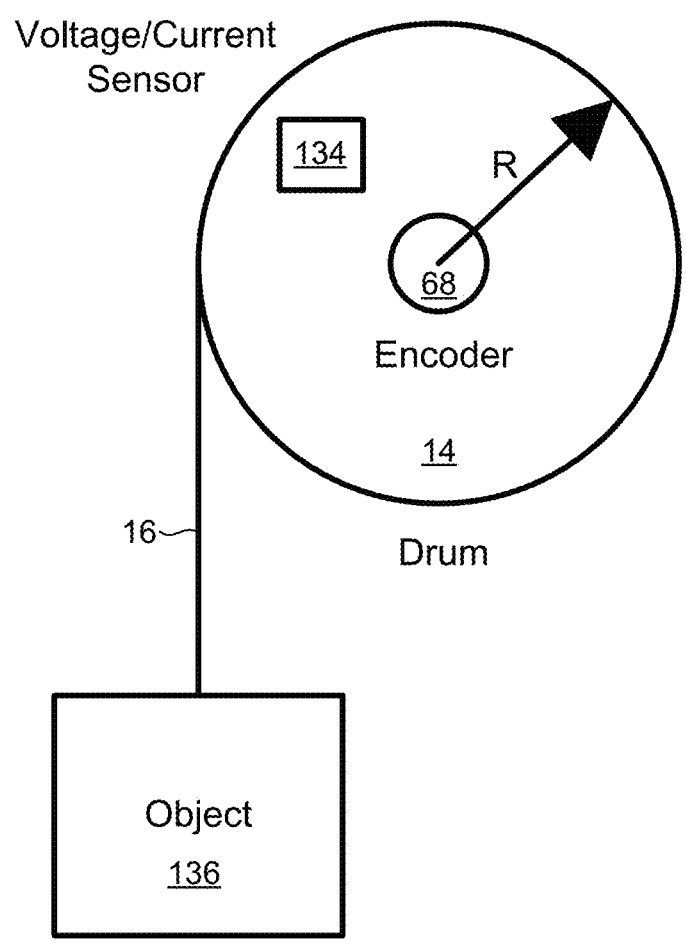
FIG. 34 is a block diagram showing how a motorized lifting device in accordance with the invention may calculate the weight of a load.

Referring to FIG. 34, one important feature of the motorized lifting device 10 is its ability to determine the weight of an object 136 attached to the line 16. The disclosed motorized lifting device 10 may accomplish this by monitoring lifting speed as well as power consumed by the motor 54. Lifting speed may be measured by calculating a change in position (using the encoder 68) divided by time. Power consumed by the motor 54 may be measured with a voltage/current sensor 134. As previously mentioned, the grooved drum 14 and single layer of line 16 help to ensure that the line 16 maintains a constant radius throughout the wind.

The weight of the object 136 creates a back torque on the motor 54 through the drum 14 and gearbox 56. The amount of power consumed (measured by the voltage/current sensor 134) and the speed of the motor 54 (determined with the encoder 68) vary in accordance with the amount of torque required to lift the object 136. Thus, the amount of power consumed (minus any power consumed by the motorized lifting device 10 absent weight on the line 16) as well as the speed of the motor 54 may be used to calculate the amount of torque. The torque will generally remain constant as long as the weight and radius remain constant. The amount of torque and radius may be used to calculate the amount of weight attached to the end of the line 16. For a group of motorized lifting devices 10 lifting a shared load, the weight of the shared load may be calculated by summing the individual weights calculated for each motorized lifting device 10.

Once the weight of an object is known, it may be used for various purposes, including reporting the weight back to a monitoring device (such as the controller 106), or setting thresholds of operation causing the motorized lifting device 10 to shut down or stop if a weight limit is exceeded. More advanced uses may include monitoring changes in the load, and causing the motorized lifting device 10 to perform various automated responses, such as stopping, reversing direction, or reporting errors, if the load changes by more than a specified amount. For example, if the motorized lifting device 10 detects that little or no load is supported by the line 16 for a specified time period, the motorized lifting device 10 may raise the line 16 up to a high set point to prevent safety issues associated with dangling or stray lines 16.

In other cases, a significant or sudden decrease in load may indicate that an object 136 has detached from the line 16 or has come to rest on another object, which may in turn trigger an automated response (e.g., raising up the line 16). Similarly, a significant or sudden increase in the load may indicate that the line 16 has undesirably caught on another object, become tangled, or the like, which may also trigger an automated response. The weight measurement may also be helpful to more optimally distribute a shared load across multiple motorized lifting devices 10, as previously discussed. For example, each motorized lifting device 10 in a group may report weight back to a controller 106, which may then provide feedback to a user in the form of weight values or suggestions how to more optimally distribute the load.

Figure 35A:
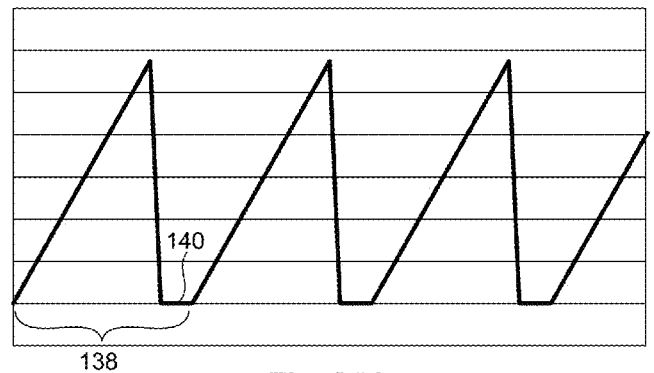
FIG. 35A is a graph showing an output from a resistive encoder.
Figure 35B:
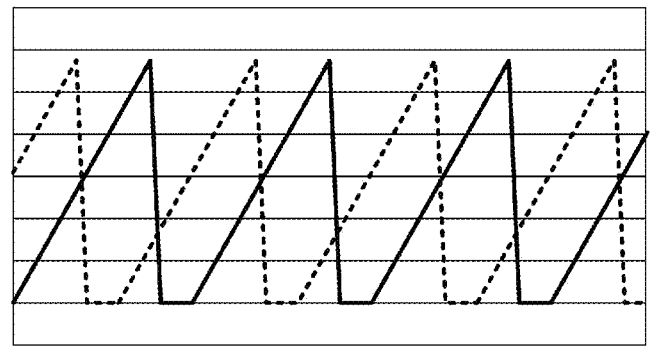
FIG. 35B is a graph showing a combined output from two rotationally offset resistive encoders.
Figure 35C:
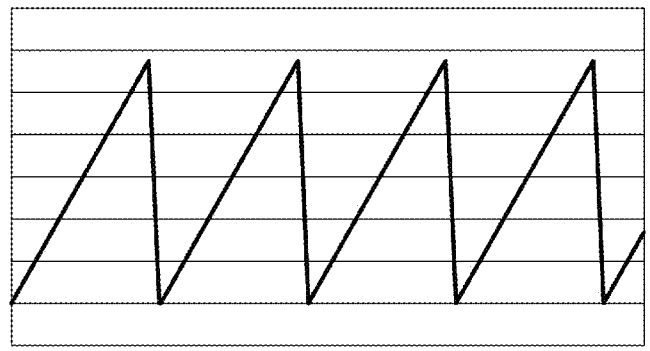
FIG. 35C is a graph showing an output from a magnetic encoder.

Referring to FIGS. 35A through 35C, as previously mentioned, an absolute position encoder 68 may be used to measure an angular position of the drum 14 without calibration, even after power interruptions. A counter may keep track of a number of rotations of the drum 14 and store this information in non-volatile memory. This information (i.e., the angular position and the number of rotations) may enable the motorized lifting device 10 to precisely and quickly determine how much line 16 is let out from the drum 14, even after a significant event such as a power outage.

As previously mentioned, various different types of absolute position encoders 68 may be used to determine the angular position of the drum 14. The type of absolute position encoder 68 used and the way it is implemented may be based at least partly on the type of output it produces. FIG. 35A shows an output from a resistive absolute position encoder 68 over several revolutions. FIG. 35C shows an output from a magnetic absolute position encoder 68 over several revolutions.

A resistive rotary encoder 68 may produce an absolute analog value over a revolution. As previously mentioned, in one embodiment, the encoder 68 may be coupled to a post 70 incorporated into the drum 14 in order to monitor angular position. In some resistive encoders 68, a shaft moves an internal wiper of the encoder 68 which in turn changes an analog value output from the encoder. The resistive encoder 68 may produce an output that is characterized by a "dead spot" or "dead band". This "dead spot" or "dead band" may reflect a portion of the rotation where the internal wiper is no longer connected to an internal resistive element. The waveform 138 (FIG. 35A) represents the output from the resistive encoder 68 over one revolution. As shown, the waveform 138 includes a dead band 140 which produces no analog output.

In certain embodiments, any drawbacks of the dead band 140 of the resistive encoder 68 may be mitigated by using a pair of resistive encoders 68 offset by some angle to prevent overlapping of their dead bands 140, such as is illustrated in FIG. 35B. The dotted line represents the output from the additional resistive encoder 68. As shown, the dead bands from the two encoders do not overlap. The output from the additional resistive encoder 68 may be monitored while the other resistive encoder 68 is passing through its dead band, and vice versa.

In other embodiments, a magnetic encoder 68 may be used as the absolute position encoder 68. In such embodiments, the short post 70 may be replaced with a diametrically polarized magnet that rotates with the drum 14. The magnet's rotational position may be monitored by a magnetic resolver mounted proximate the polarized magnet. Such an embodiment may be advantageous in that no mechanical shaft may be required to turn a physical wiper, as may occur in a resistive encoder. This eliminates wear and tear caused by rubbing parts. Rather, the angular position may be magnetically coupled to a sensor with no contact required. Also, unlike a resistive encoder, a magnetic encoder may have no "dead band," as shown in FIG. 35C.

Referring to FIGS. 36A through 36D, in certain embodiments in accordance with the invention, it may be advantageous to convey power and/or data to or from an object (e.g., a tool, electromagnet, camera, transducer, battery, sensor, etc.) attached to an end of the line 16. For example, if a power tool is attached to the end of the line 16, power and/or control signals may need to be conveyed to the power tool. If a sensor is attached to the end of the line 16, power may be provided to the sensor and data may be gathered from the sensor. In some embodiments, power may be provided to an electrical receptacle at the end of the line 16. Other possible scenarios where it may be desirable to convey power and/or data to or from an object at the end of the line 16 are possible and within the scope of the invention.

In certain embodiments in accordance with the invention, a transmission cable for conveying power and/or data may be incorporated into the line 16. This transmission cable may be configured to support all or part of a load at the end of the line 16. Thus, the transmission cable may bear a load in addition to transporting power and/or data. In other embodiments, the transmission cable is non-load-bearing, meaning that a separate load-bearing cable or wire may also be incorporated into the line 16. In other embodiments, the transmission cable bears a portion of the load, while another cable bears the rest of the load. The cables may be encased in rubber, plastic, or other insulating materials to electrically isolate the cables from one another, protect the cables from damage, as well as prevent shorting with other objects.

In certain embodiments, multiple transmission cables may be incorporated into the line 16. For example, separate power and data cables may be incorporated into the line 16, or possibly multiple power cables or multiple data cables, depending on the application involved. The transmission cables may be fully load-bearing, partially load-bearing or non-load-bearing as previously described. In certain embodiments, a separate load-bearing cable or wire may be used alongside the transmission cables.

Figure 36A:
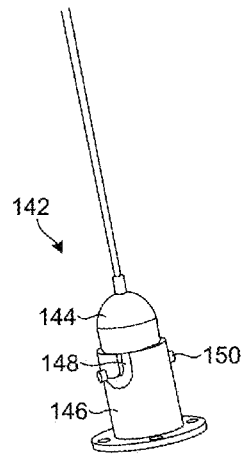
FIGS. 36A-D are several views of one embodiment of a connector for use with a motorized lifting device in accordance with the invention.
Figure 36B:
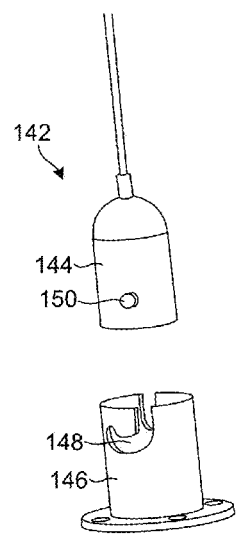
Figure 36C:
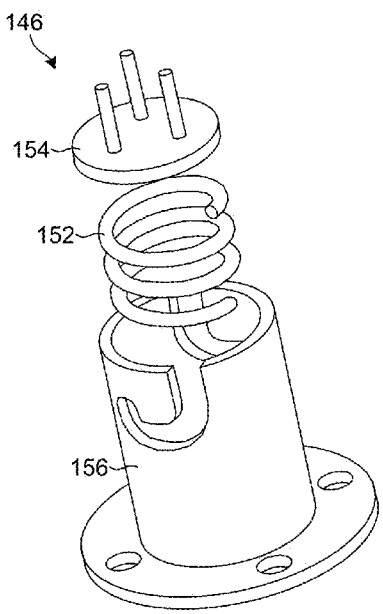
Figure 36D:
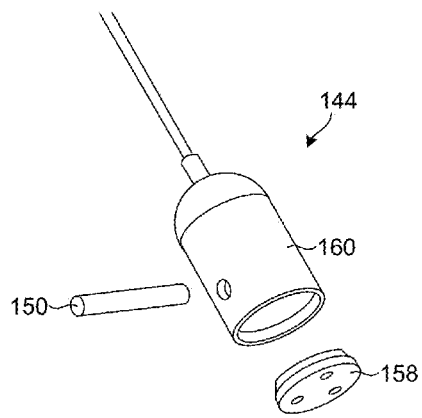

Because the line 16 may support a load in addition to providing power and/or data to objects at the end of the line 16, a connector may be needed that can both convey power and/or data as well as support a load. FIGS. 36A through 36D show several views of a connector 142 that may perform both functions. As can be seen in the Figures, the connector 142 may include an interlocking plug 144 and socket 146. In this embodiment, the plug 144 is connected to the line 16 and the socket 146 would connect to an object. FIG. 36A shows the plug 144 and socket 146 interlocked with one another. FIG. 36B shows the plug 144 and socket 146 disconnected from one another. FIG. 36C shows an exploded view of the socket 146 and FIG. 36D shows an exploded view of the plug 144.

As can be observed in FIGS. 36A and 36B, the line 16 is firmly connected to the plug 144 to provide load-bearing capabilities. In this embodiment, the socket 146 includes a hook-shaped slot 148 configured to receive a pin 150 of the plug 144. To connect the plug 144 to the socket 146, the plug 144 may be inserted into the socket 146, pushed down to compress a spring 152 or other biasing member 152, and twisted and released so that the pin 150 becomes confined in the hook-shaped slot 148. The spring 152 may take up slack between the plug 144 and socket 146 to ensure that the plug 144 and socket 146 stay connected to one another. Disconnecting the plug 144 and socket 146 may be the same as connecting the components, except that the components may be twisted in the opposite direction.

FIG. 36C shows a socket 146 that includes a platform 154 comprising three pins, a spring 152 urging the platform 154 in an upward direction, and a base 156 to connect the socket 146 to an object. Power and/or data cables (not shown) may connect to the pins of the platform 154. FIG. 36D shows a plug 144 comprising a three-hole receptacle 158, mounted to a body 160, to mate with the pins of the platform 154. The pin 150 for interlocking with the socket 146 is also shown. Power and/or data cables (not shown) incorporated into the line 16 connect to contacts within the holes of the three-hole receptacle 158.

Figure 37A:
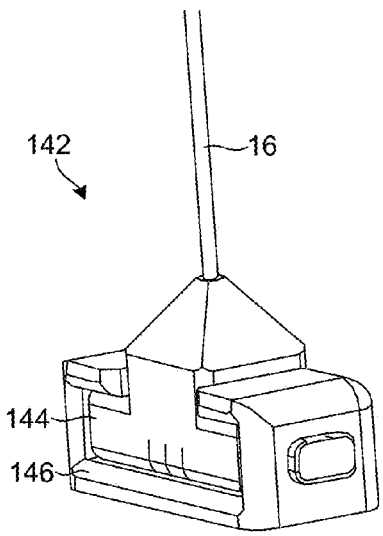
FIGS. 37A and 37B are several views of another embodiment of a connector for use with a motorized lifting device in accordance with the invention.
Figure 37B:
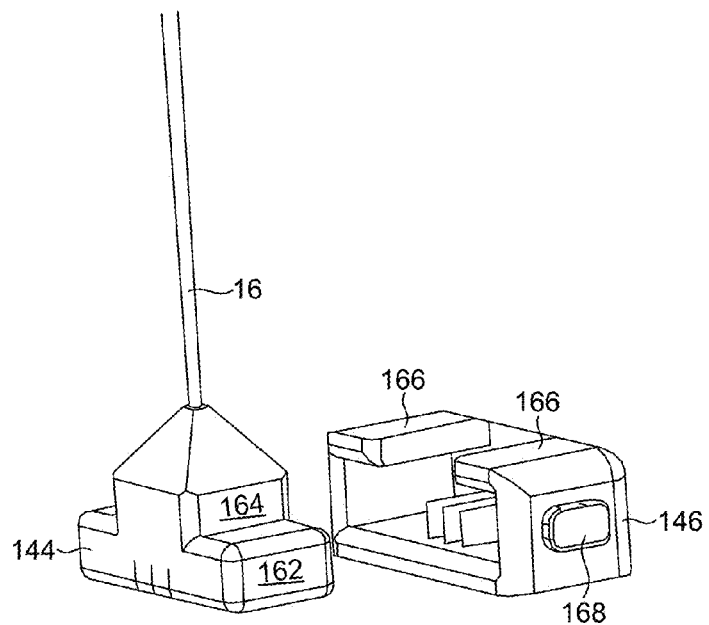

Referring to FIGS. 37A and 37B, another embodiment of a connector 142 is illustrated. In this embodiment, the connector 142 includes a plug 144 configured to slide into a socket 146 in a direction substantially perpendicular to a direction applied by a load. FIG. 37A shows the plug 144 and socket 146 interlocked with one another. FIG. 37B shows the plug 144 and socket 146 disconnected from one another.

As shown, the plug 144 includes a broad base portion 162 and a narrower upper portion 164. The broad base portion 162 may snap into the socket 146 to bring electrical contacts of the plug 144 into contact with electrical contacts of the socket 146. A release button 168 may retain the plug 144 within the socket 146. Pressing the release button 168 may release the plug 144 from the socket 146. The design of the connector 142 may prevent the load from being exerted on the release button 168. Rather, a pair of flanges 166 on the socket 146 may retain the broad base portion 162 of the plug 144 and support most if not all of the load placed on the connector 142.

Referring to FIG. 38, a high-level view showing various electronic hardware components that may be used in a motorized lifting device 10 in accordance with the invention is illustrated. As previously discussed, in order to avoid interference between various electronic components, in certain embodiments logistics electronics 170 may be mounted proximate a first end of the motorized lifting device 10 and power electronics 172 may be mounted proximate a second end of the motorized lifting device 10.

In general, the logistics electronics 170 may include lower power electronics such as a communication module 176 to enable data and commands (i.e., communication signals 190) to be communicated to the motorized lifting device 10 from external devices, data processing electronics such as a microcontroller 174, an encoder 68 for measuring an angular position of the drum, and non-volatile memory 178 for storing data. A communication module 176 may include, for example, a Bluetooth controller 176 for receiving wireless Bluetooth communications from external devices, such as an external controller 106, to control the motorized lifting device 10. Other types of communication modules 176, such as WIFI modules, Zigbee modules, or the like, may also be used to enable communication with the motorized lifting device 10.

Among other functions, the microcontroller 174 may be used to process data and commands received from devices such as the controller 106, encoder 68, voltage/current sensor 134, temperature sensor 184, or the like, and generate appropriate control signals 186 to control the motor 54 or other devices. For example, the microcontroller 174 may receive commands from a remote control 106 to lift, lower, or stop the line 16, and execute the commands by sending appropriate control signals 186 to the motor 54. The microcontroller 174 may also receive commands to lift or lower the line 16 to a pre-established set point, and execute the commands by sending appropriate control signals 186 to the motor 54. Using inputs from the encoder 68, the microcontroller 174 may keep track of the angular position of the drum 14, the number of rotations of the drum 14, as well as the current position of the end of the line 16. The microcontroller 174 may also monitor the voltage/current sensor 134 or temperature sensor 184 to prevent overloading or overheating. Using inputs from the voltage/current sensor 134 and encoder 68, the microcontroller 174 may calculate operating parameters such as the weight of a load attached to the line 16. These represent just a few functions that may be performed by the microcontroller 174. Other features and functions performed by the microcontroller 174 or other components will be discussed in association with FIGS. 39 and 40.

In general, power electronics 172 may include higher power electronics to receive power 192 and drive the motor 54. Such power electronics 172 may include, for example, a motor driver 180 to drive the motor 54, a relay 182 for shorting terminals of the motor 54 when the drum 14 stops or when power is interrupted, a voltage/current sensor 134 for sensing voltage or current to the motor 54, or a temperature sensor 184 for sensing a temperature of the motor 54. Placing the logistics electronics 170 and power electronics 172 on separate ends of the motorized lifting device 10 may prevent noise or other signals generated by the power electronics 172 from interfering with operation of the more sensitive logistics electronics 170. As previously discussed, a power and/or data cable 24, such as a ribbon cable 24, may be routed across a top of the motorized lifting device 10 to enable power and/or data 188 to be communicated between the logistics electronics 170 and the power electronics 172.

Figure 39:
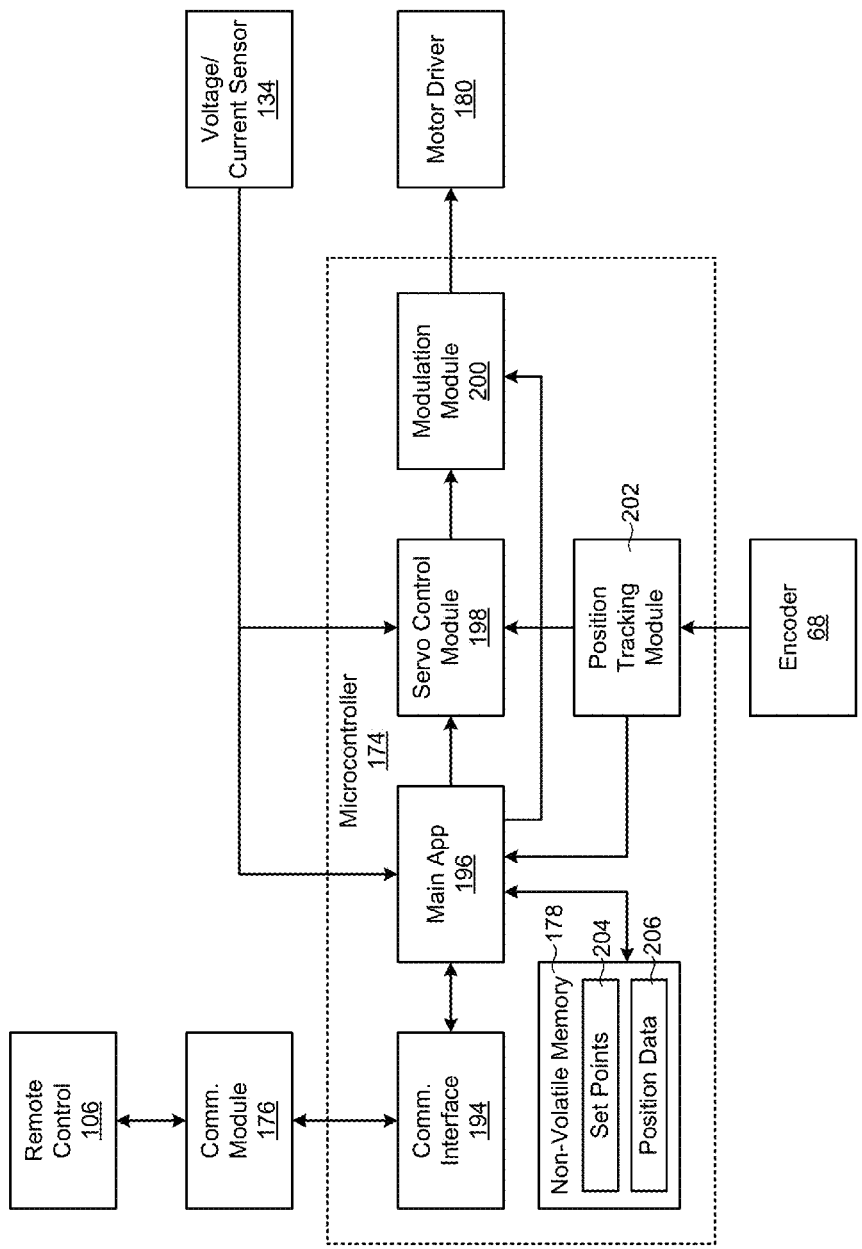
FIG. 39 is a high-level view showing various functions that my be provided by the hardware components of FIG. 38.

Referring to FIG. 39, a more particular view of the microcontroller 174 described in FIG. 38 is illustrated. Various blocks are shown within the microcontroller 174 to provide a better understanding of various features or functions that may be provided by the microcontroller 174. The blocks may be implemented in hardware, firmware, or a combination thereof. Arrows have also been drawn between the blocks to show possible communication between blocks. The blocks and arrows are provided by way of example and should not be interpreted as indicating the complete set of functions or communications that may occur within the microcontroller 174. In other embodiments, certain functions and communications shown in the microcontroller 174 may be implemented on different hardware components or even distributed across multiple hardware components. For example, the non-volatile memory 178 illustrated in FIG. 39 may be implemented within the microcontroller 174 or as a device separate from the microcontroller 174.

As shown in FIG. 39, in certain embodiments, the microcontroller 174 may include one or more of a communication interface 194, a main application 196, a servo control module 198, a modulation module 200, a position tracking module 202, and non-volatile memory 178. A communication interface 194 may allow the microcontroller 174 to communicate (i.e., send or receive data or commands) with a remote control 106 by way of the communication module 176 previously discussed. The main application 196 may perform a wide variety of features and functions, the likes of which will be discussed in more detail hereafter through the use of various examples. Among other duties, the main application 196 may coordinate the activities of other modules or components inside or outside the microcontroller 174.

The servo control module 198 may generate an error signal based on a difference between a current position of the end of the line 16 and a desired position for the end of the line 16. Based on this error signal, a modulation module 200 may produce a control signal using a suitable modulation technique (e.g., pulse-width modulation, or PWM). This modulated control signal may be sent to the motor driver 180 to control the motor 54 with the intention of bringing the current position of the end of the line 16 closer to the desired position for the end of the line 16. The servo control module 198 may continually monitor the difference between the current position of the end of the line 16 and the desired position for the end of the line 16 and adjust the error signal accordingly.

A position tracking module 202 may monitor the current position of the end of the line 16. This may be accomplished by keeping track of the angular position of the drum 14 (received from the encoder 68) and the number of rotations of the drum (using a counter). In certain embodiments, the current position data 206 may be stored in non-volatile memory 178 so that if a power outage were to occur, the motorized lifting device 10 could immediately determine the current position of the end of the line 16 by reading the position data 206.

As indicated above, operation of the main application 196 and microcontroller 174 may be best understood through various examples. Assume, for example, that a user wishes to establish a low set point based on the current position of the end of the line 16. To accomplish this, the user may press the "set low" button 118 on the controller 106. In response, the controller 106 may generate an appropriate command (such as a "set low" command) and send this command to the microcontroller 174 by way of the communication module 176. Upon receiving this command through the communication interface 194, the main application 196 may identify the command as a "set low" command and execute the command. Executing the command may include determining the current position of the end of the line 16 by querying the position tracking module 202 (or reading the position data 206 in the non-volatile memory 178), and then setting the low set point to equal the current end of the line 16. The low set point may be recorded in the non-volatile memory 178 for retrieval at a later time.

Assume now that the current end of the line 16 is raised above the low set point and that the user wants the end of the line 16 to go to the low set point. To accomplish this, the user may press the "smart lower" button 122 on the controller 106. In response, the controller 106 may generate a "smart lower" command and send this command to the main application 196 by way of the communication module 176 and communication interface 194. Upon receiving the command, the main application 196 may identify the command as a "smart lower" command and execute the command. Executing the command may include retrieving the low set point 204 from the non-volatile memory 178 and determining a current position of the end of the line 16. Control may then be passed to the servo control module 198 to generate an error signal based on the difference between the position associated with the low set point and the current position of the end of the line 16. The modulation module 200 may receive the error signal and generate a control signal for controlling the motor 54. As line is let out from the motorized lifting device 10, the servo control module 198 continually monitors the difference between the current position of the end of the line 16 and the desired position for the end of the line 16 and adjusts the error signal accordingly. The speed of the motor 54 and position of the line 16 may be continually adjusted until the error signal reaches zero. When the error signal reaches zero, the current end of the line 16 will be at the position associated with the low set point.

In another example, the main application 196 may continually monitor the weight at the end of the line 16. The main application 196 may accomplish this by monitoring the power consumed by the motor 54 (using the voltage/current sensor 134) and the speed of the motor 54 (using the position tracking module 202). If the weight exceeds the rating of the motorized lifting device 10, the main application 196 may shut off the motorized lifting device 10, such as by cutting off power to the motor 54. In certain embodiments, the weight may be periodically reported to the controller 106 for presentation to a user. Like weight monitoring, the main application 196 may also monitor the temperature of the motor 54 (using the temperature sensor 184) and shut off the motorized lifting device 10 if the temperature exceeds a specified value. Shutting off the motor 54 may cause the locking mechanism 62 to engage and prevent rotation of the drum 14.

In other examples, the main application 196 may receive and execute other types of commands from the controller 106. For example, a user may press the lift, lower, or stop buttons 112, 114, 116 on the controller 106. Each of these buttons may cause a different command to be generated and sent to the microcontroller 174. Upon receiving these commands, the main application 196 may execute the commands by sending appropriate control signals to the motor 54 to lift, lower, or stop the motor 54. Other types of commands are also possible and within the scope of the invention. In general, the main application 196 may receive commands from the controller 106 and execute the commands on the motorized lifting device 10.

Figure 40:
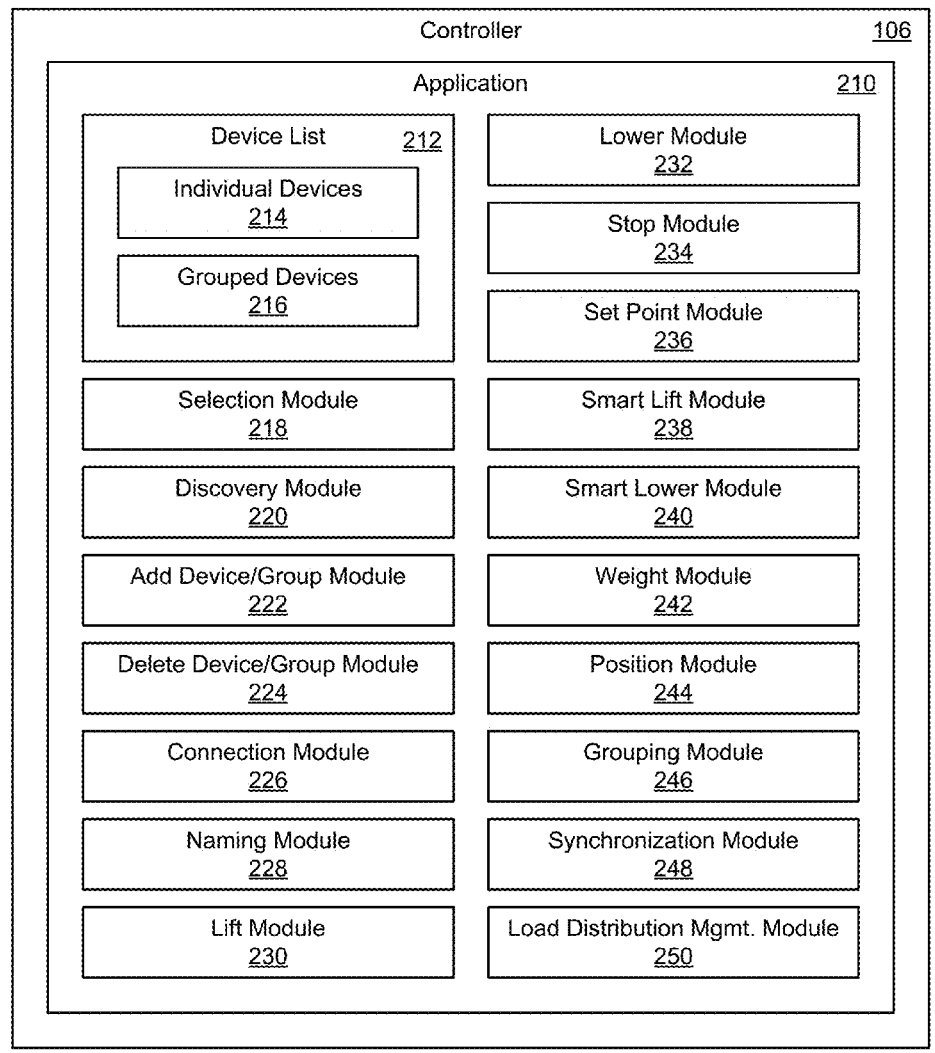
FIG. 40 is a block diagram showing various modules, implemented in hardware and/or software, that perform various features and functions in association with the motorized lifting device.

Referring to FIG. 40, one embodiment of an application 210 for implementation on a controller 106 is illustrated. Such an application 210 may include one or more modules for implementing various features or functions. Such modules may be implemented in hardware, software, or a combination thereof. It should be recognize that although such modules are shown to be implemented in an application 210 hosted on the controller 106, the modules are not necessary implemented on the controller 106 or entirely on the controller 106. For example, certain functionality in the controller 106 may have corresponding functionality in the motorized lifting device 10. For example, functionality for generating commands (e.g., lift, lower, stop commands) at the controller 106 may have corresponding functionality for executing the commands at the motorized lifting device 10.

In other cases, a motorized lifting device 10 may be configured to act as a controller 106. For example, if several motorized lifting devices 10 are configured to operate in a synchronized manner, one motorized lifting device 10 from the group may be configured to act as a master, while other motorized lifting devices 10 may be configured to act as slaves. In such cases, certain functionality may be implemented in the master while other functionality is implemented in the slaves. For example, a master may include functionality to generate commands while the slaves may include functionality to execute the commands from the master. Thus, a motorized lifting device 10 may, in certain embodiments, be configured with functionality shown in the controller 106. Thus, although shown in the controller 106, the illustrated modules may be distributed across multiple devices or in some cases implemented on devices other than the controller 106.

As shown in FIG. 40, in certain embodiments, an application 210 in accordance with the invention may present a device list 212 to a user. This device list 212 may display individual devices 214 (i.e., individual motorized lifting devices 10 configured for independent operation), and grouped devices 216 (groups of motorized lifting devices 10 configured for synchronized operation). As can be appreciated, in certain embodiments a user may own or use multiple motorized lifting devices 10, with some being configured for independent operation and others being configured for grouped (i.e., synchronized) operation. The device list 212 may help the user manage the individual or grouped motorized lifting devices 10 that he or she uses or owns.

A selection module 218 may enable a user to select an individual device 214 or grouped device 216 from the device list 212 in order to perform desired operations. For example, a user may select an individual device 214 from the device list 212 and perform lift, lower, stop, set low, set high, smart lift, or smart lower operations on the individual device 214. Similarly, the user may select a grouped device 216 from the device list 212 and perform lift, lower, stop, set low, set high, smart lift, or smart lower operations on the grouped device 216. The motorized lifting devices 10 associated with the grouped device 216 may then operate in a seamless synchronized manner as if the grouped motorized lifting devices 10 were a single device.

A discovery module 220 may enable a user to discover new devices so that they may be added to the device list 212. Discovery may be needed, for example, when initially setting up one or more motorized lifting devices 10. Similarly, if a user adds a new motorized lifting device 10 to an already existing collection of motorized lifting devices 10, the discovery module 220 may discover (i.e. detect, such as wirelessly detect) the addition of the new motorized lifting device 10 so that the motorized lifting device 10 can be added to the device list 212. Techniques for wireless discovery, such as are commonly used with Bluetooth devices, WIFI devices, or the like, may be used by the discovery module 220, depending on the communication protocol used. In certain embodiments, a communication protocol is selected that provides secure communication between the application 210 and the user's devices, ensuring that unauthorized users are not able to gain control.

Once devices are discovered by the discovery module 220, an add device/group module 222 may enable a user to add a device or group to the device list 212. Similarly, a delete device/group module 224 may enable a user to delete a device or group from the device list 212. Once a device or group is added to the device list 212 or alternatively a user selects a device or group from the device list 212, a connection module 226 may establish a connection with the device or group. This will enable data and commands to be communicated between the controller 106 and the device or group. For example, if a Bluetooth communication protocol is used, pairing procedures of the Bluetooth protocol may be followed to establish connections with devices or groups in the list 212.

In certain embodiments, a naming module 228 may enable a user to name devices or groups of devices in the device list 212. This may help the user to distinguish between devices and groups in the device list 212. For example, if a motorized lifting device 10 is used to lift a bicycle, the motorized lifting device 10 may be named "bike lift" in the device list 212. Similarly, if a group of motorized lifting devices 10 is used to lift a platform holding holiday decorations, the group may be named "holiday decoration lift." In certain embodiments, the naming module 228 may be configured to assign default names (e.g., "lift 1", "lift 2", "group 1", "group 2") to devices or groups in the event names are not assigned by a user.

As previously discussed in association with FIG. 29, in certain embodiments an application 210 in accordance with the invention may provide one or more of a lift button 112, lower button 114, and a stop button 116. A lift module 230, lower module 232, and stop module 234 may be provided to implement the functionality of these buttons. In general, when one of these buttons is pressed, a command may be generated at the controller 106 and sent to a motorized lifting device 10 or group of motorized lifting devices 10 for execution thereon.

A set point module 236 may enable a user to establish various set points for the end of the line 16. For example, when a user presses the previously discussed "set low" button 118 or "set high" button 120, the set point module 236 may cause a low or high set point to be established and stored in non-volatile memory 178. The set point module 236 may in certain embodiments also enable a user to establish and store intermediate set points between the low set point and high set point. When a "smart lower" button 122 is pressed, a smart lower module 240 may cause a low set point (or a next set point lower than a current position of the end of the line 16) to be retrieved from memory 178 and cause a motorized lifting device 10 or group of motorized lifting devices 10 to lower the end of the line 16 to the set point. Similarly, when a "smart lift" button 124 is pressed, a smart lift module 238 may cause a high set point (or a next set point higher than a current position of the end of the line 16) to be retrieved from memory 178 and cause the motorized lifting device 10 or group of motorized lifting devices 10 to raise the end of the line 16 to the set point.

In certain embodiments, the application 210 includes a weight module 242 to determine an amount of weight lifted by a motorized lifting device 10 or group of motorized lifting devices 10. In certain embodiments, the weight may be calculated from the amount of power consumed by the motor 54 and/or the speed of the motor 54 when lifting an object. In certain embodiments, the weight module 242 may display the weight value to a user, thereby allowing the user to make adjustments where needed. Among other benefits, knowledge of an object's weight may enable the motorized lifting device 10 to be automatically shut off when a weight rating has been exceeded; enable changes in weight to trigger various automated responses (e.g., lifting, lowering, or stopping the line 16); and/or provide feedback to a user so that a load may be adjusted or more evenly distributed among multiple motorized lifting devices 10.

The application 210 may also include a position module 244 to determine a current position of the end of the line 16. As previously mentioned, this may be accomplished using the absolute position encoder 68 previously described, keeping track of the number of rotations of the drum 14, and using a single layer of line 16 on the drum 14 to ensure that an effective radius of the drum 14 stays constant. Using an absolute position encoder 68 and storing position data 206 in non-volatile memory 178 will also ensure that an accurate position can be determined even after a significant event such as a power outage. Among other benefits, the ability to accurately determine a position of the end of the line 16 at any given time may enable resumption of operation after a power outage with no need for recalibration; repeatability of operations such as returning to set points; synchronization of multiple motorized lifting devices 10; and other advanced operations and automation.

A grouping module 246 may be used to group multiple motorized lifting devices 10 for synchronized operation. In certain embodiments, the grouping module 246 enables a user to select individual devices 214 from the device list 212 for inclusion in the group. Once grouped, a synchronization module 248 may ensure that the motorized lifting devices 10 in the group operate in a synchronized manner. For example, the synchronization module 248 may monitor the speed and/or position of the end of the line 16 for each of the motorized lifting devices 10 in the group and make adjustments to the speed and/or position of other motorized lifting devices 10 to maintain synchronization. In certain embodiments, the synchronization module 248 may be configured to identify a slowest moving motorized lifting device 10 in the group and adjust the other motorized lifting devices 10 in the group to match the pace of the slowest motorized lifting device 10. Similarly, if a motorized lifting device 10 in the group stops for some reason (e.g., a power outage or overload condition), the synchronization module 248 may ensure that the other motorized lifting devices 10 in the group also stop. This may prevent unsafe conditions in addition to keeping the devices synchronized.

Instead of just ensuring that a shared load stays level, the synchronization module 248 may also synchronize the motorized lifting devices 10 in other ways. For example, in certain cases, it may be desirable for a platform or other shared load to tilt and return to level. For example, in an automated environment such as a factory, a platform could potentially carry granular or liquid materials that may be poured from the platform by tilting. In such a case, the synchronization module 248 may cause certain motorized lifting devices 10 in the group to tilt the platform to perform a pouring operation. The platform may then be returned to level after the pouring operation is complete. In certain embodiments, the weight module 242 may be used to determine that a pouring operation is complete by sensing how the weight of the platform has changed. The above example represents just one type of advanced synchronization operation that is possible and is not intended to be limiting. Other synchronization operations are possible and within the scope of the invention.

In certain embodiments, the application 210 includes a load distribution management module 250 to assist in more optimally distributing a load across multiple motorized lifting devices 10. In certain embodiments, this may include providing feedback to a user regarding how much weight is supported by each motorized lifting device 10 in a group, as was discussed in association with FIG. 32. Using this information, a user may rearrange or reposition a shared load to more optimally distribute the weight across the motorized lifting devices 10a, 10b. In other or the same embodiments, the load distribution management module 250 may be configured to provide suggestions or instructions regarding how to redistribute weight among multiple motorized lifting devices 10, as further discussed in association with FIG. 32.

The disclosed features and functions of the motorized lifting device 10 may enable advanced capabilities and automation that may not otherwise be possible using convention hoists or winches. These capabilities may be useful in a wide variety of industries or professions. For example, in a hospital setting, the motorized lifting device 10 may be used to suspend, raise, and lower a wide variety of medical tools and instruments from a ceiling or other structure. These tools and instruments may descend from the ceiling or structure when needed by a healthcare practitioner. In a manufacturing environment, specialized tools may descend when required by a worker. In a lab setting, transducers or other lab equipment may be suspended from a ceiling and descend when a specific test is required. In an automotive setting, one or more motorized lifting devices 10 may fill an automobile with fuel or charge an automobile battery without requiring assistance of a user. This may be accomplished, for example, using instruments such as cameras (to assist in navigation) and magnets (to assist in attachment) at the end of the line 16. Magnets may include traditional magnets or electromagnets that may be activated and deactivated as needed. Such magnets may attach to magnetic regions incorporated into various objects. These represent just a few potential applications for the motorized lifting device 10 and are not intended to be limiting. Other applications are possible and within the scope of the invention.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a motor;
   a drum rotated by the motor to draw in or let out a line from the drum, the drum comprising a groove formed in an outer surface thereof to accommodate the line; and
   a roller tracking and extending into the groove immediately over the line in order to push the line into the groove.

2. The apparatus of claim 1, wherein a depth of the groove is larger than a diameter of the line.

3. The apparatus of claim 1, wherein the roller pushes the line to a bottom of the groove.

4. The apparatus of claim 1, wherein the roller is attached to a guide for guiding the line into the groove.

5. The apparatus of claim 4, wherein the guide is a passive guide that tracks the groove.

6. The apparatus of claim 1, wherein the roller slides along an axis substantially perpendicular to the groove.

7. The apparatus of claim 1, wherein the groove is configured to grip the line.

8. The apparatus of claim 1, wherein a width of the groove is slightly narrower than the line.

9. The apparatus of claim 1, wherein the groove is a helical groove.

10. The apparatus of claim 1, wherein the roller passively tracks the groove.

11. A method comprising:
    rotating a drum to draw in or let out a line, the drum comprising a groove formed in an outer surface thereof to accommodate the line; and
    pushing the line into the groove with a roller tracking and extending into the groove immediately over the line.

12. The method of claim 11, wherein a depth of the groove is larger than a diameter of the line.

13. The method of claim 11, wherein pushing the line into the groove comprises pushing the line to a bottom of the groove.

14. The method of claim 11, further comprising guiding the line into the groove.

15. The method of claim 14, wherein guiding the line into the groove comprises passively guiding the line into the groove.

16. The method of claim 11, wherein tracking the groove comprises sliding the roller along an axis substantially perpendicular to the groove.

17. The method of claim 11, wherein the groove is configured to grip the line.

18. The method of claim 11, wherein the groove is slightly narrower than the line.

19. The method of claim 11, wherein the groove is a helical groove.

20. The method of claim 11, wherein tracking the groove comprises passively tracking the groove.

* * * * *